(12) United States Patent
Moss et al.

(10) Patent No.: US 11,826,674 B2
(45) Date of Patent: Nov. 28, 2023

(54) PRESSURIZED SOLVENT EXTRACTION OF PLANT BIOMASS FEEDSTOCKS

(71) Applicant: SENSIENT NATURAL EXTRACTION INC., Delta (CA)

(72) Inventors: Ryan Moss, Delta (CA); Eduardo Cacace, Delta (CA); Benjamin Lightburn, Delta (CA); Lisa Ranken, Delta (CA)

(73) Assignee: SENSIENT NATURAL EXTRACTION INC., Delta (CA)

( * ) Notice: Subject to any disclaimer, the term of this patent is extended or adjusted under 35 U.S.C. 154(b) by 164 days.

(21) Appl. No.: 16/979,224

(22) PCT Filed: Feb. 19, 2019

(86) PCT No.: PCT/CA2019/050196
§ 371 (c)(1),
(2) Date: Sep. 9, 2020

(87) PCT Pub. No.: WO2019/169477
PCT Pub. Date: Sep. 12, 2019

(65) Prior Publication Data
US 2021/0052993 A1    Feb. 25, 2021

(30) Foreign Application Priority Data
Mar. 9, 2018   (CA) .................. CA 2997850

(51) Int. Cl.
*B01D 11/02*    (2006.01)
(52) U.S. Cl.
CPC ...... *B01D 11/0292* (2013.01); *B01D 11/0207* (2013.01); *B01D 11/0288* (2013.01)
(58) Field of Classification Search
CPC ............ B01D 11/0292; B01D 11/0207; B01D 11/0288; B01D 11/0284; B01D 11/0215;
(Continued)

(56) References Cited

U.S. PATENT DOCUMENTS

| | | | | |
|---|---|---|---|---|
| 2004/0166177 | A1* | 8/2004 | Martin | A23L 33/115 424/725 |
| 2007/0014912 | A1* | 1/2007 | Mazza | A23L 5/44 426/615 |
| 2015/0157958 | A1* | 6/2015 | Mazza | B01D 11/0207 422/618 |

(Continued)

FOREIGN PATENT DOCUMENTS

| | | |
|---|---|---|
| CA | 2546138 A1 | 11/2006 |
| CA | 2836200 A1 | 2/2014 |

OTHER PUBLICATIONS

Ammar Altemimi et al, "Phytochemicals: Extraction, Isolation, and Identification of Bioactive Compounds from Plant Extracts", , published Sep. 22, 2017 from Plants (Basel), doi: 10.3390/plants6040042, in pubmed.gov. (Year: 2017).*

(Continued)

*Primary Examiner* — Joseph W Drodge
(74) *Attorney, Agent, or Firm* — Quarles & Brady, LLP

(57) ABSTRACT

Methods for extracting and recovering bioactive components from a biomass feedstock with pressurized aqueous solvent solutions comprising one or more organic solutes and/or one or more inorganic solutes. The methods comprise the steps of: (i) preparing a selected aqueous solvent solution for pressurizing; (ii) providing a flow of the prepared aqueous solvent solution to a plant biomass feedstock contained within a pressure-resistant temperature-controllable reactor vessel (iii) warming the flow of aqueous solvent solution and the contents of the reactor vessel to a selected temperature; (iv) pressurizing the flow of the aqueous solvent solution and the contents of the reactor vessel to a selected pressure; (v) controllably flowing the pressurized aqueous solvent solution through the reactor vessel while maintaining the contents of the reactor vessel at the selected pressure; and (vi) collecting a flow of the pressurized (Continued)

aqueous solvent solution egressing from the reactor vessel for a selected period of time.

20 Claims, 14 Drawing Sheets

(58) Field of Classification Search
CPC ............ B01D 11/0203; B01D 11/0204; B01D 11/028; C02F 2209/02; C02F 2209/03; C02F 2301/066; C02F 2301/08; C11B 1/10; C11B 3/006; A23L 2513/23; B01J 19/006; B01J 19/0013; B01J 19/0046; B01J 2219/00045; B01J 2219/00051; B01J 2219/00162; B01J 2219/00164; B01J 2219/00495; B01J 2219/0059; B01J 2219/00599; B01J 2219/00601

See application file for complete search history.

(56) References Cited

U.S. PATENT DOCUMENTS

| | | | | |
|---|---|---|---|---|
| 2016/0228789 | A1* | 8/2016 | Joseph | B01D 11/0407 |
| 2018/0153948 | A1* | 6/2018 | Murphy | A61K 36/185 |
| 2020/0406164 | A1* | 12/2020 | Blank | B01D 11/0207 |
| 2020/0406167 | A1* | 12/2020 | Cacace | B01J 20/261 |
| 2021/0052993 | A1* | 2/2021 | Moss | B01D 11/0215 |

OTHER PUBLICATIONS

Kayini Chigayo et al, Phytochemical and antioxidant properties of different solvent extracts of Kirkia wilmsi tubers", Asian Pacific Journal of Tropical Biomedicine", Available online Oct. 17, 2016. (Year: 2016).*

Canadian Intellectual Property Office. Office Action for application 2,997,850. dated Jun. 27, 2018. 4 pages.

Dent, M., et al. "The effect of extraction solvents, temperature and time on the composition and mass fraction of polyphenols in Dalmatian wild sage (*Salvia officinalis* L.) extracts." Food technology and biotechnology 51.1 (2013) 84-91.

International Searching Authority. International Search Repod and Written Opinion for application PCT/CA2019/050196. dated May 13, 2019. 8 pages.

Kim, J-W, et al. "Extraction and separation of carbohydrates and phenolic compounds in flax shives with pH-controlled pressurized low polarity water." Journal of Agricultural and Food Chemistry 57.5 (2009): 1805-1813.

Saldana, Mda, et al. "Pressurized fluid systems: phytochemical production from biomass." The Journal of Supercritical Fluids 96 (2015): 228-244.

Selvamuthukumaran, M., and John Shi "Recent advances in extraction of antioxidants from plant by-products processing industries." Food Quality and Safety 1.1 (2017): 61-81.

* cited by examiner

| TIME (min) | Column #1 | Column #2 | Column #3 | Column #4 | Column #5 | Column #6 | TIME (min) |
|---|---|---|---|---|---|---|---|
| 0 | Loading 1st batch | | | | | | 0 |
| 10 | Flooding | | | | | | 10 |
| 20 | | Loading 2nd batch | | | | | 20 |
| 30 | Warning | Flooding | | | | | 30 |
| 40 | | | Loading 3rd batch | | | | 40 |
| 50 | Processing | Warning | Flooding | | | | 50 |
| 60 | | | | Loading 4th batch | | | 60 |
| 70 | | Processing | Warning | Flooding | | | 70 |
| 80 | | | | | Loading 5th batch | | 80 |
| 90 | | | Processing | Warning | Flooding | | 90 |
| 100 | | | | | | Loading 6th batch | 100 |
| 110 | | | | Processing | Warning | Flooding | 110 |
| 120 | | | | | | | 120 |
| 130 | | | | | Processing | Warning | 130 |
| 140 | Cooling | | | | | | 140 |
| 150 | | | | | | Processing | 150 |
| 160 | Unloading / Loading 7th batch | Cooling | | | | | 160 |
| 170 | | | | | | | 170 |
| 180 | Flooding | Unloading / Loading 8th batch | Cooling | | | | 180 |
| 190 | | | | | | | 190 |
| 200 | Warning | Flooding | Unloading / Loading 9th batch | Cooling | | | 200 |
| 210 | | | | | | | 210 |
| 220 | Processing | Warning | Flooding | Unloading / Loading 10th batch | Cooling | | 220 |
| 230 | | | | | | | 230 |
| 240 | | Processing | Warning | Flooding | Unloading / Loading 11th batch | Cooling | 240 |
| 250 | | | | | | | 250 |
| 260 | | | Processing | Warning | Flooding | Unloading / Loading 12th batch | 260 |
| 270 | | | | | | | 270 |
| 280 | | | | Processing | Warning | Flooding | 280 |
| 290 | | | | | | | 290 |
| 300 | | | | | Processing | Warning | 300 |
| 310 | Cooling | | | | | | 310 |
| 320 | | | | | | Processing | 320 |
| 330 | Unloading | Cooling | | | | | 330 |
| 340 | | | | | | | 340 |
| 350 | | Unloading | Cooling | | | | 350 |
| 360 | | | | | | | 360 |
| 370 | | | Unloading | Cooling | | | 370 |
| 380 | | | | | | | 380 |
| 390 | | | | Unloading | Cooling | | 390 |
| 400 | | | | | | | 400 |
| 410 | | | | | Unloading | Cooling | 410 |
| 420 | | | | | | | 420 |
| 430 | | | | | | Unloading | 430 |
| 440 | | | | | | | 440 |
| 450 | | | | | | | 450 |
| 460 | | | | | | | 460 |
| 470 | | | | | | | 470 |
| 480 | | | | | | | 480 |

Fig. 9

PRESSURIZED SOLVENT EXTRACTION OF PLANT BIOMASS FEEDSTOCKS

This application is a national stage entry of International Application No. PCT/CA2019/050196, filed Feb. 19, 2019, and claims priority to Canadian Application 2,997,850 filed Mar. 9, 2018, both of which are incorporated herein by reference in their entirety.

TECHNICAL FIELD

Various embodiments disclosed herein generally relate to phytochemicals from plant biomass feedstocks. More specifically, this disclosure pertains to methods and systems for generation and use of pressurized aqueous organic solvents for extractions of phytochemicals from plant biomass feedstocks.

BACKGROUND

Phytochemicals are chemical compounds that occur naturally in plants and are among other things, responsible for color such as exemplified by the deep purple of blueberries and organoleptic properties such as exemplified by the smell of garlic. Some phytochemicals are used in nutraceutical products that are generally sold in medicinal forms not usually associated with food.

There are three classes of phytochemicals that are of particular interest i.e., polyphenols, specialty carbohydrates, and glycosides. Polyphenols, also referred to as phenolics, are compounds that function mainly as antioxidants and anti-inflammatories when ingested by humans. Polyphenols can be synthesized industrially, but they are mainly made available by extraction from plants and microorganisms.

The current approach to the extraction of plant components is through use of either organic solvents or unpressurized hot water to solubilise and remove phytochemicals from plant biomass. The organic solvent systems commonly use one or more of ethanol, methanol, ethyl acetate and acetone. However, organic solvents are generally toxic and their commercial use requires explosion-proof facilities provided with storage and handling equipment certified for use with toxic and flammable chemicals. Furthermore, solvents may remain in final products as unhealthy trace compounds and their toxic properties raise safety concerns for human consumption.

It is well-known that hot-water systems tend to be less efficient than organic solvent-based systems and are able to only extract a portion of the potentially available phytochemicals from plant biomass. It is also well-known that heating water under pressure to temperatures above its boiling point results in alteration of its key properties such as pH and polarity and decreases its dielectric constant to values that approximate those of solvents such as those exemplified by ethanol and methanol. Such pressurized hydrothermal processes may be referred to as autohydrolysis and hydrothermolysis include steam explosion, pressurized low polarity water (PLPW; also commonly referred to as superheated water, subcritical water, pressurized hot water, compressed hot water). Such hydrothermal processes cause the catalytic action of hydronium ions from water ionization that occurs during controlled and concurrently increased temperatures and pressures over selected time periods to produce in situ acids such as acetic acid generated from acetyl groups in the plant biomass, that will hydrolyse the polysaccharides and lignins comprising the biomass thereby releasing and further breaking down biomass into its constituent components.

SUMMARY

The embodiments of the present disclosure generally relate to methods for extracting and recovering bioactive components from a biomass feedstock with pressurized aqueous solutions comprising combinations of one or more organic solutes and/or one or more inorganic solutes. The methods generally comprises the steps of:
 (i) preparing a selected aqueous solvent solution comprising one or more solutes, for pressurizing;
 (ii) providing a flow of the prepared aqueous solvent solution to a pressure-resistant temperature-controllable reactor vessel wherein has been provided a selected plant biomass feedstock, thereby flooding the contents of the reactor vessel;
 (iii) warming the flooded contents of the reactor vessel to a first selected temperature;
 (iv) pressurizing the flow of the prepared aqueous solvent solution and the flooded contents of the reactor vessel to a first selected pressure;
 (v) controllably flowing the pressurized prepared aqueous solvent solution through the reactor vessel while maintaining the contents of the reactor vessel at the first selected pressure; and
 (vi) collecting a first flow of the pressurized prepared aqueous solvent solution egressing from the reactor vessel for a selected period of time.

According to one aspect, the methods may additionally comprise a step of removing a portion of the aqueous solvent solution from the collected first egressing flow thereby producing a first concentrated fluid extract of bioactive components from the biomass feedstock.

According to another aspect, the methods may additionally comprise a step of drying a portion of the collected first egressing flow of pressurized prepared aqueous solvent solution thereby producing a first dried extract of bioactive components from the biomass feedstock.

BRIEF DESCRIPTION OF THE DRAWINGS

The present invention will be described in conjunction with reference to the following drawings in which:

FIG. 9 is a schematic flowchart showing the operation of the commercial-scale PLPW extraction system shown in FIGS. 6 and 7;

DETAILED DESCRIPTION

Figure 1:
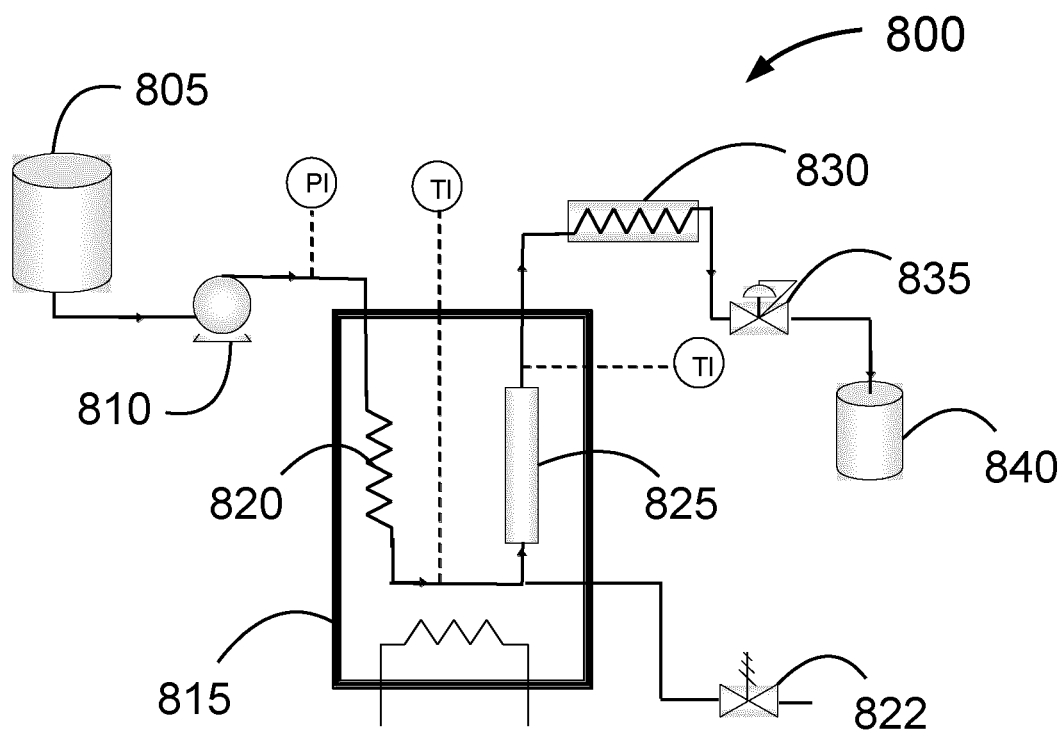
FIG. 1 is a schematic diagram showing a prior art example of a laboratory bench-scale pressurized low polarity water (PLPW) extraction system.

The exemplary embodiments of present disclosure pertain to methods and systems for generating and use of heated and pressurized aqueous solvent solutions for extraction and recovery of components, also referred to herein as phytochemicals, from plant biomass feedstocks contained within reactor columns.

As used herein, the term "phytochemical" means a chemical produced by a plant during its primary and/or secondary metabolism. Phytochemicals include among other things, carotenoids, polyphenols, antioxidants, phenolic acids, flavonoids, stilbenes, lignans, anthocyanins, flavones, isoflavones, flavanols, catechins, epicatechins, proanthocyanidins, isothiocyanates, allyl sulfides, indoles, protease inhibitors, terpenes, saponins, allicins, lycopene, lutein, resveratrol, cannabinoids, and the like.

The term "preconditioned water" as used herein refers to water that has been purified by filtration to remove among other things particulates, organic molecules, microorganisms, and the like, and/or deionized water and/or water that has been conditioned by reverse osmosis.

It is known that pressurized low polarity water (PLPW) apparatus and systems can be designed and used for extraction of phytochemicals from a wide variety of plant biomass feedstocks. Such equipment and systems can be used to controllably increase pressure applied to a supply of preconditioned water maintained within a closed system at a temperature selected from a range of about 35° C. to about 300° C., for example between about 40° C. to about 250° C., about 50° C. to about 200° C., about 60° C. to about 175° C., and about 70° C. to about 150° C., about 80° C. to about 140° C., about 90° C. to about 130° C., and therebetween. The pressure applied may be from a range of about 0.7 MPa (i.e., 100 psi) to about 17.2 MPa (i.e., 2500 psi), from about 1.4 MPa (i.e., 200 psi) to about 13.8 MPa (i.e., 2000 psi), from about 2.0 MPa (i.e., 300 psi) to about 11 MPa (i.e., 1600 psi), from about 2.8 MPa (i.e., 400 psi) to about 10.3 MP (i.e., 1500 psi).

Those skilled in this art will understand that such PLPW equipment and apparatus can be used, after PLP water has been generated at a selected temperature and pressure, to controllably flow the PLP water through a pressure-resistant reactor column containing plant biomass therein, to extract phytochemicals and other components from the plant biomass, and then to collect and process the egressing phytochemical-containing PLP water to recover and purify and/or concentrate the recovered phytochemicals. Those skilled in this art will understand that such PLPW apparatus and systems can be configured and operated to controllably increase the pressure applied to preconditioned water at a single selected temperature to selectively increase the types and/or yields of phytochemicals extracted and recovered from different types of plant biomass feedstocks. The skilled artisans will also understand that such PLPW apparatus and systems can be configured and operate to controllably increase the temperature applied to preconditioned water at a single selected pressure to selectively increase the types and/or yields of phytochemicals extracted and recovered from different types of plant biomass feedstocks. The skilled artisans will also understand that such PLPW apparatus and systems can be configured and operate to controllably and concurrently increase the temperature and the pressure applied to preconditioned water to selectively increase the types and/or yields of phytochemicals extracted and recovered from different types of plant biomass feedstocks. Such PLPW extraction systems modify the physical characteristics of the water matrix thereby reducing its polarity and surface tension to bridge a gap between high polarity and moderate polarity whereby the dielectric constant ($\varepsilon$) of water can be lowered from 80 to 20.

An embodiment of the present disclosure relates to use of PLPW equipment and/or systems to controllably modify the physical characteristics of prepared aqueous solvent solutions comprising containing therein selected solutes, for use to extract phytochemicals and other components from plant biomass feedstocks.

According to one aspect, the present disclosure pertains to use of PLPW equipment and/or systems to generate pressurized aqueous solvent solutions comprising food-safe organic solutes such as ethanol, 2-propanol, ethyl acetate, ethyl lactate, hexane, cyclohexane, and the like. Such organic solutes can be mixed with water, for example to provide a range of solute/water ratios (w/w) of about 99:1 (i.e., 99%) to about 1:99 (i.e., 1%), for example about 95%, 90%, 80%, 70%, 60%, 50%, 40%, 30%, 25%, 20%, 10%, 5%, 2.5%, and therebetween.

According to another aspect, the present disclosure pertains to use of PLPW equipment and/or systems to generate pressurized aqueous solvent solutions comprising organic solutes such as methanol, acetone, chloroform, dichloromethane, diethel ether, isopropyl ether, diisopropyl ether, dioxin, petroleum ether, tetrahydrofuran, and the like. Certain ones of these organic solutes are miscible in water and therefore can be mixed with water for example, in a range of solvent/water ratios (w/w) of about 99:1 (i.e., 99%) to about 1:99 (i.e., 1%), for example about 95%, 90%, 80%, 70%, 60%, 50%, 40%, 30%, 25%, 20%, 10%, 5%, 2.5%, and therebetween. Certain ones of these organic solutes are not miscible in water but are miscible with other organic solutes for example, in a range of solute/solute ratios (w/w) of about 99:1 to about 1:99, for example about 95:5 (w/w), 90:10 (w/w), 80:20 (w/w), 75:25 (w/w), 70:30 (w/w), 60:40 (w/w), 50:50 (w/w), 40:60 (w/w), 30:70 (w/w), 25:75 (w/w), 20:80 (w/w), 10:90 (w/w), 5:95 (w/w), and therebetween. Those skilled in this art will know which mixtures of organic solutes are suitable for use with PLPW equipment and/or systems, and which mixtures are not.

According to another aspect, the present disclosure pertains to use of PLPW equipment and/or systems to generate pressurized aqueous solvent solutions with mixtures of water and organic acids that are known to be food-safe, for example formic acid, acetic acid, propionic acid, butyric acid, valeric acid, lactic acid, malic acid, citric acid, benzoic acid, carbonic acid, sorbic acid, and the like. Suitable mixtures of one or more selected afore-mentioned organic acids with water may be selected from a range of about 0.001 mg/mL to about 1.25 mg/mL. Those skilled in this art will be able to determine a suitable mixture range for a selected organic acid in water based on the selected organic acid's known chemical properties. For example, suitable ranges may be about 0.01 mg/mL to about 1.0 mg/mL, about 0.02 mg/mL to about 0.8 mg/mL, about 0.03 mg/mL to about 0.6 mg/mL, about 0.04 mg/mL to about 0.5 mg/mL, and therebetween.

According to another aspect, the present disclosure pertains to use of PLPW equipment and/or systems to generate pressurized aqueous solvent solutions with solutes that are known to modulate viscosity of solutions. Examples of viscosity-modulating solutes include glycerol, propylene glycol, polyethylene glycol, sorbitol, n-propyl alcohol, and the like. Such viscosity-modulating solutes may be diluted with water for example, in a range of solute/water ratios (w/w) of about 99:1 (i.e., 99%) to about 1:99 (i.e., 1%), for example about 95%, 90%, 80%, 70%, 60%, 50%, 40%, 30%, 25%, 20%, 10%, 5%, 2.5%, and therebetween. Such viscosity-modulating solutes may be combined in mixtures with other organic solutes disclosed herein to improve and maintain the stability of phytochemical molecules extracted and recovered from plant biomass feedstocks with pressurized organic solutes using the methods disclosed herein.

According to another aspect, the present disclosure pertains to use of PLPW equipment and/or systems to generate pressurized aqueous solvent solutions wherein the pH has been adjusted with a selected pH-adjusting agent. Examples of suitable pH-adjusting agents include organic solutes and inorganic solutes such as acetic acid, monobasic ammonium phosphate, calcium acetate, calcium carbonate, calcium chloride, calcium citrate, calcium hydroxide, calcium oxide, monobasic calcium phosphate, calcium sulfate, citric acid, fumaric acid, lactic acid, magnesium citrate, magnesium sulfate, malic acid, phosphoric acid, potassium hydroxide, sodium hydroxide, and the like. Those skilled in these arts will understand how to select one of said pH-adjusting agents and the like, and the use thereof to adjust the pH of a selected aqueous solvent solution prior to pressurizing the pH-adjusted aqueous solvent solution.

According to an embodiment of the present disclosure, the aqueous solvents disclosed herein are suitable for pressurization by known prior art PLPW apparatus and systems previously designed and employed for extraction of phytochemicals from a wide variety of plant biomass feedstocks with PLP water.

For example, Canadian Patent No. 2,836,200 disclosed a laboratory-scale PLPW apparatus having one reactor column as shown in FIG. 1 wherein the laboratory-scale PLPW apparatus 800 comprised a water supply 805, a high-performance liquid chromatography (HPLC) pump 810 (Waters 515 model, Milford, Mass.), a temperature-controlled oven 815 (Model 851F, Fisher Scientific, Pittsburgh, Pa.), a 2.0-m preheating coil (stainless steel tubing with 3.2 mm (⅛") o.d.) 820, a reactor column 825, a 1.0 m cooling coil 830 (stainless steel tubing with 3.2 mm (⅛") o.d.), a back pressure regulator 835 with a cartridge of 5.2 MPa (750 psi) (Upchurch Scientific, Oak Harbor, Wash.) to maintain pressure in the system, and a collection vessel 840. A pressure relief valve 822 was also provided interposed the preheating coil 820 and the reactor column 825. Stainless steel tubing (3.2 mm (⅛") o.d.) and connectors were used to connect the equipment pieces (i.e., the HPLC pump, reactor column, and back pressure regulator). The bench-scale reactor column 825 (FIG. 9) was constructed out of stainless steel tubing (1.27 cm (½") o.d., 1.0 cm i.d.×10 cm length) and capped with chromatography-column end fittings (Chromatographic Specialties Inc, Brockville, ON, CA).

Figure 2:
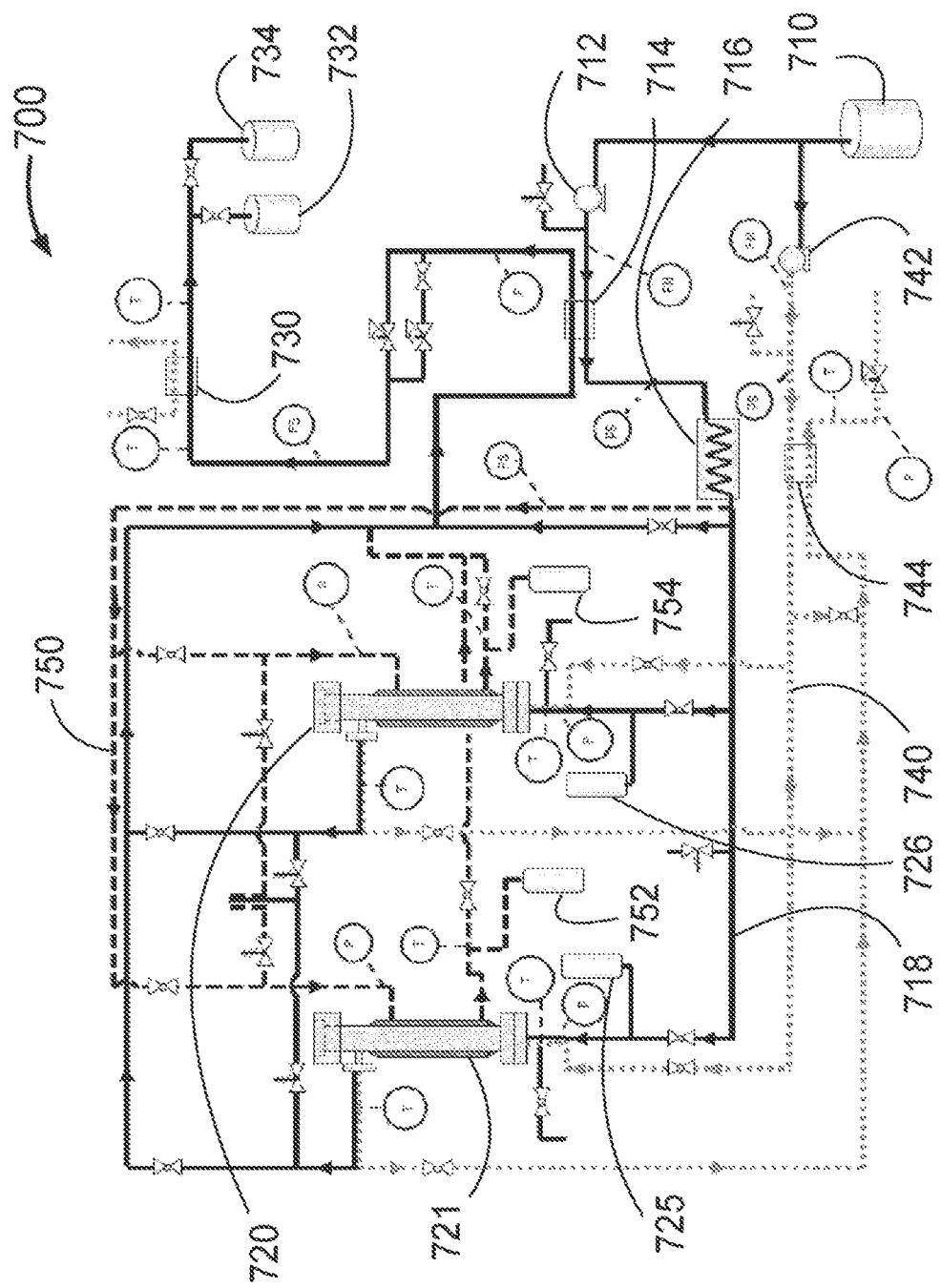
FIG. 2 is a schematic diagram showing a prior art example of a 2-column pilot-scale PLPW system.

Canadian Patent No. 2,836,200 also disclosed a pilot-scale PLPW apparatus 700 having two reactor columns 720, 721 as shown in FIG. 2. The reactor columns 720, 721 have a maximum operating pressure of 6200 kPa (900 psi) at an operating temperature of 204° C. The column jackets are designed for a lower maximum operating pressure of 2,580 kPa (375 psi) at an operating temperature of 204° C. to prevent crushing of the column if the jacket is pressurized and the column is not. However, because several other pieces of equipment, such as the accumulators 725, 726 have been certified for temperatures and pressures less than those of the columns 720, 721, the maximum operating pressure and temperature of this two-column system, as a whole, is set at 5500 kPa (800 psi) and 180° C., and the maximum operating pressure of the jacket circuit 750 is 2400 kPa (350 psi). The process flow 718 for the pressurized low polarity water extraction system is shown in FIG. 2. Process water is drawn from the water reservoir 710 with a positive displacement pump 712 (i.e., process pump) and passed through heat exchanger 714 where the process water is first used to cool and recover heat from the liquid extract exiting the system. The partially heated water then enters the immersion heater 716, where it is heated to the desired process temperature. The system is controlled to direct the heated water either through the column jackets to warm the equipment, or through the column 720 packed with the feedstock to be extracted. The exiting liquid extract/process water flows back through heat exchanger 714 where energy is recovered and the product temperature is lowered to below the boiling point before reaching back pressure regulator 751. The purpose of the back pressure regulator 751 is to maintain the system pressure at a point above the saturation pressure at the operating processing temperature to prevent the formation of steam. After back pressure regulator 751 there is an additional heat exchanger 730 that may be used to control the final temperature of the outgoing liquid extract/process water. This heat exchanger 730 is connected to another water source, whereby the flow can be adjusted by a valve to cool the exiting liquid to the desired temperature. The liquid extract/process water is directed to either the collection vessel 732 or waste water vessel 734 for use elsewhere in the process.

Figure 3:
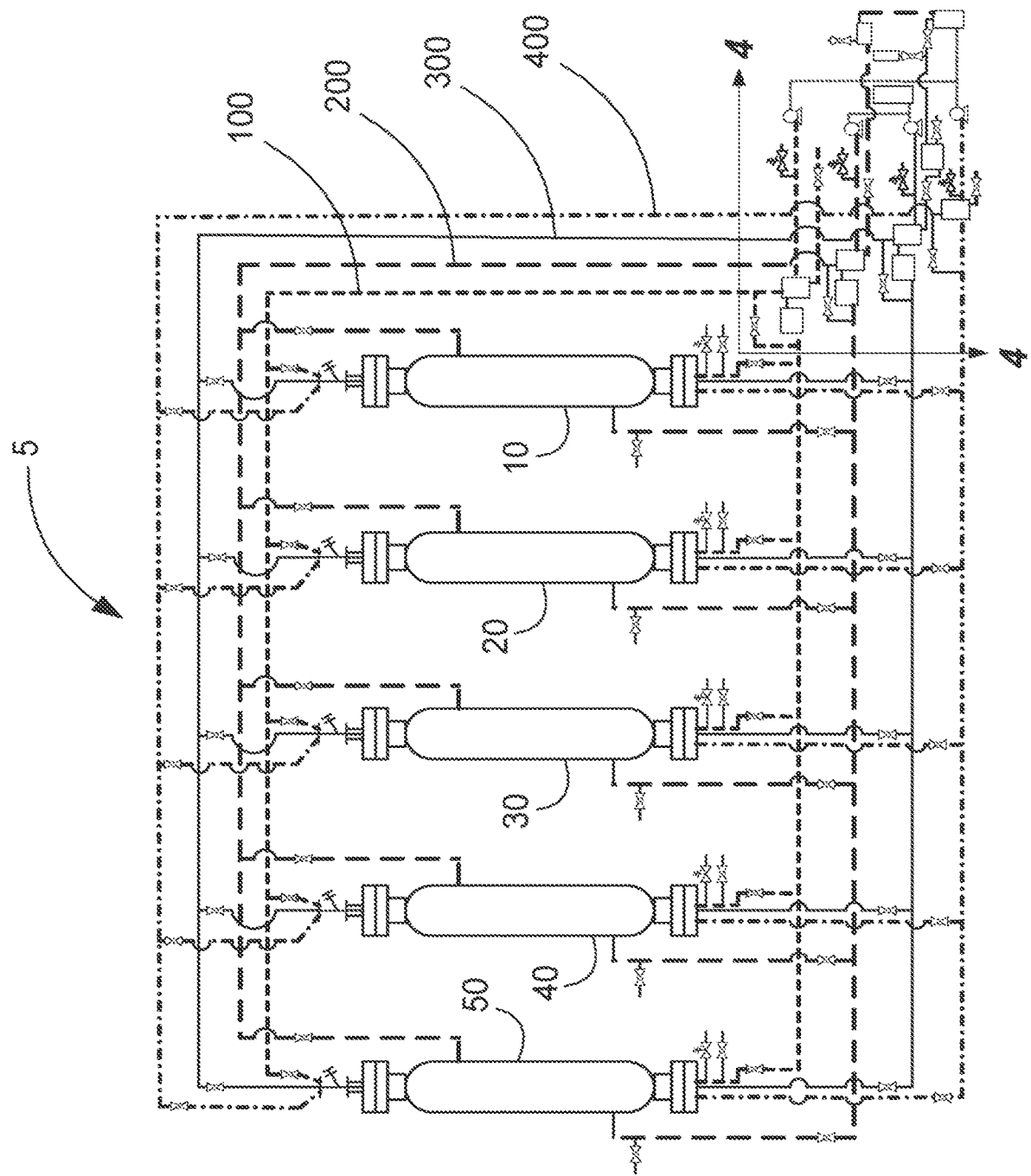
FIG. 3 is a schematic diagram of a prior art example of a commercial-scale five-column PLPW system.
Figure 4:
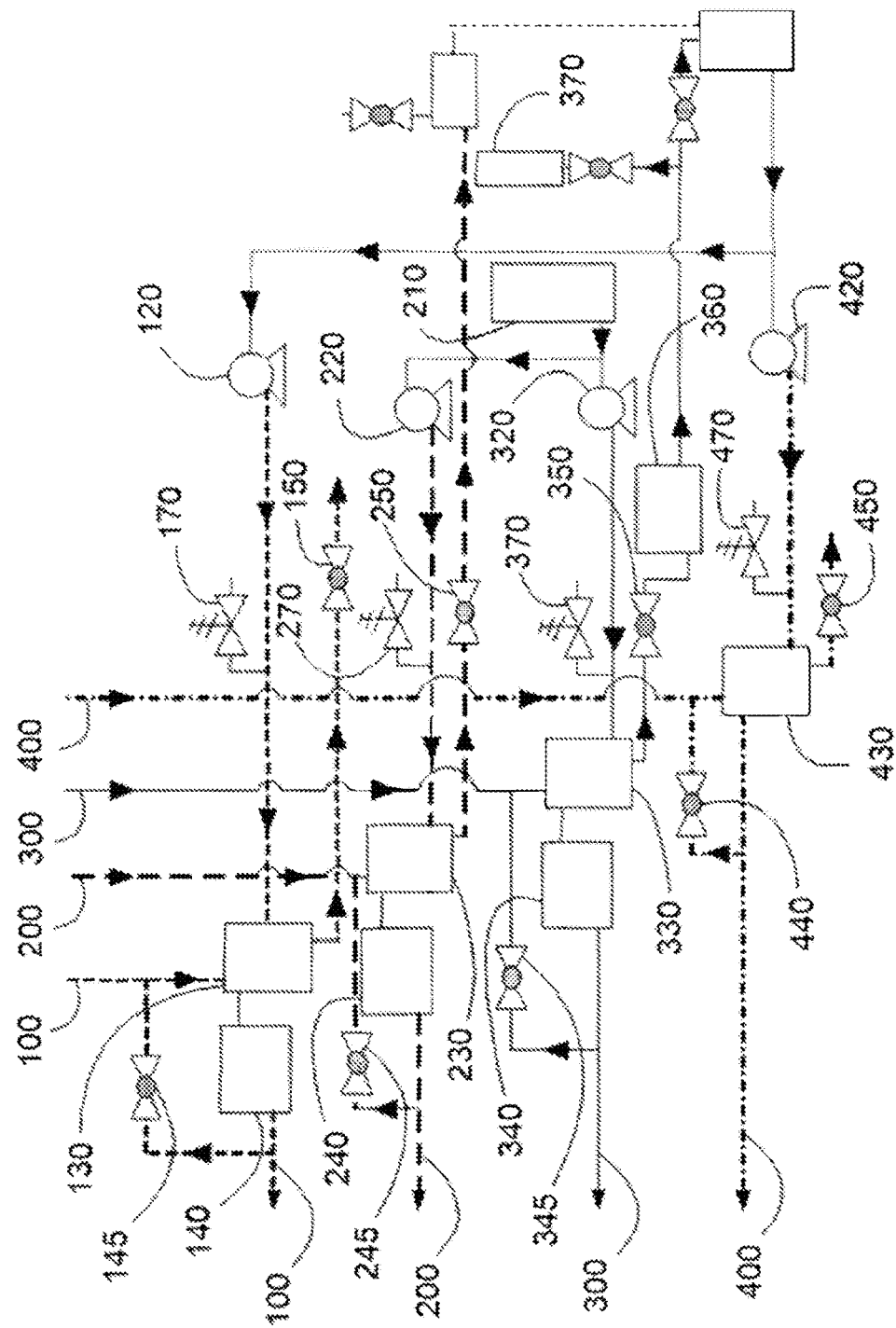
FIG. 4 is a close-up view of section 4 from FIG. 3.

Canadian Patent No. 2,836,200 also disclosed a commercial-scale PLPW apparatus and system 5 having five reactor columns 10, 20, 30, 40, 50 as shown in FIGS. 3 and 4. The commercial scale apparatus 5 comprises four independent process circuits 100, 200, 300, 400 that control the flow of PLPW through each reactor column 10, 20, 30, 40, 50. The flow circuit for each reactor column 10, 20, 30, 40, 50 is selected by an automated control system that controls the sequencing of valve operation within each reactor column circuit as follows:

Circuit Bypass Mode:

The PLPW apparatus 5 is provided with a circuit bypass mode (FIGS. 3, 4) which enables isolation of one or more or all of the individual reactor column circuits from the rest of the PLPW apparatus. Any one of the circuit pumps 120, 220, 320, 420 flows water from a reservoir 110, 210 through: (i) the input side of a heat exchanger 130, 230, 330, 430, (ii) a heater 140, 240, 340, (iii) the output side of the heat exchanger 130, 230, 330, 430, (iv) the back pressure regulator 150, 250, 350, 450, (v) a secondary heat exchanger 260, 360, and then to (vi) the reservoir 110 or to a waste water drain. Each of the water lines egressing from the circuit pumps 120, 220, 320, 420 is provided with a pressure relief valve 170, 270, 370, 470. The purpose of the circuit bypass mode is to pressurize and maintain the system pressure, and to adjust the pressurized low polarity (PLP) water temperature before the PLP water is introduced into the other circuits.

Flooding Circuit 100:

A selected reactor column filled with a biomass feedstock to be extracted, is flooded with hot water below 100° C. and then pressurized. This task can be accomplished in one of at least two ways. A first method utilizes an independent flooding circuit 100 (FIGS. 3, 4) wherein a pump 120 pushes water from a first water reservoir 110 through the input side of a heat exchanger 130, then through a heater 140, through one of the columns 10, 20, 30, 40, 50, through the output side of the heat exchanger 130, a back pressure regulator 150 and out of the system to a waste water drain. This option allows greater control of the flood water temperature. The flooding circuit 100 additionally comprises a bypass valve 145 to isolate the columns 10, 20, 30, 40, 50 from the flooding circuit.

A second method utilizes the cooling circuit which is described in more detail below. The second method comprises diversion of the PLP water from the back pressure regulator into the reactor column to be flooded. A second back pressure regulator allows the column to be pressurized. The benefit of the second flooding method is reduction in equipment necessary to accomplish column pressurization task (additional pump and heater), thereby allowing: (i) more water to be recycled, and (ii) recovery of additional product extracts. The drawback is that the flooding water temperature would be lower than an independent circuit (60° C. or less potentially) and multiple columns would have to be filled with biomass feedstock at the start of the processing day before processing.

Warming Circuit 200:

During the warming circuit 200 (FIGS. 3, 4), a pump 220 pushes water from a second water reservoir 210 through the input side of a heat exchanger 230, then through a heater 240, the jackets of columns 10, 20, 30, 40, 50, through the output side of the heat exchanger 230, a back pressure regulator 250, a secondary heat exchanger 260, and out of the system to the first water reservoir 110. The warming circuit 200 additionally comprises a bypass valve 245 to isolate the columns 10, 20, 30, 40, 50 from the warming circuit.

The purpose of the warming circuit is to warm the column to a selected desired processing temperature to minimize the loss of heat from the PLP water to the equipment during extraction. It is optional to separate the warming circuit from the other circuits, so that it can be run independently, by adding a pump, a heat exchanger, and a heater dedicated to the warming circuit. Alternatively, the reactor column jackets may be configured to use steam from a processing facility either with steam as the heating medium within the jacket, or through the use of a heat exchanger and water pump to use steam to indirectly heat water for the column jackets.

Processing Circuit 300:

During the processing circuit 300 (FIGS. 3, 4), a pump 320 pushes water from the second water reservoir 210 through the input side of a heat exchanger 330, then through a heater 340, after which the PLP water flows (under pressure from pump 320) through one of columns 10, 20, 30, 40, 50, that is packed with biomass feedstock to be extracted. The PLP water flows out of the column through the output side of the heat exchanger 330, through a back pressure regulator 350, a secondary heat exchanger 360, and out of the system to the collection vessel 380. The processing circuit 300 additionally comprises a bypass valve 345 to isolate the columns 10, 20, 30, 40, 50 from the processing circuit. The purpose of the processing circuit (FIG. 5) is to solubilise and extract the compounds of interest from the feedstock material. The PLP water travels through the reactor column from bottom to the top in a single pass. The least concentrated water first passes through the most extracted feedstock material, thus maximizing the amount of product extracted. Additionally, due to the continuous flow-through nature of the extraction system, product is constantly removed from the system with low residence times while exposed to the operating conditions, thus reducing the amount of potential product degradation.

Cooling Circuit 400:

The last processing circuit, the cooling circuit 400 (FIGS. 3, 4) cools down the reactor columns after the feedstock material has been fully extracted in two stages. In the cooling circuit 400, the PLP water flows through the reactor column packed with the extracted feedstock material whereby the pump 420 pushes water through the input side of the heat exchanger 430, through one of columns 10, 20, 30, 40, 50, then out of the column into the product side of the heat exchanger 430, through the back pressure regulator 450, and out of the system to the drain. The purpose of the cooling circuit is to lower the temperature of the extracted feedstock material and the reactor column to a level below the saturation temperature to enable safe removal of the extracted feedstock. Once the temperature is low enough, the system can be switched back to the first cooling circuit and the column can be drained of water, the extracted feedstock removed, and fresh material added for the next extraction run.

Figure 5:
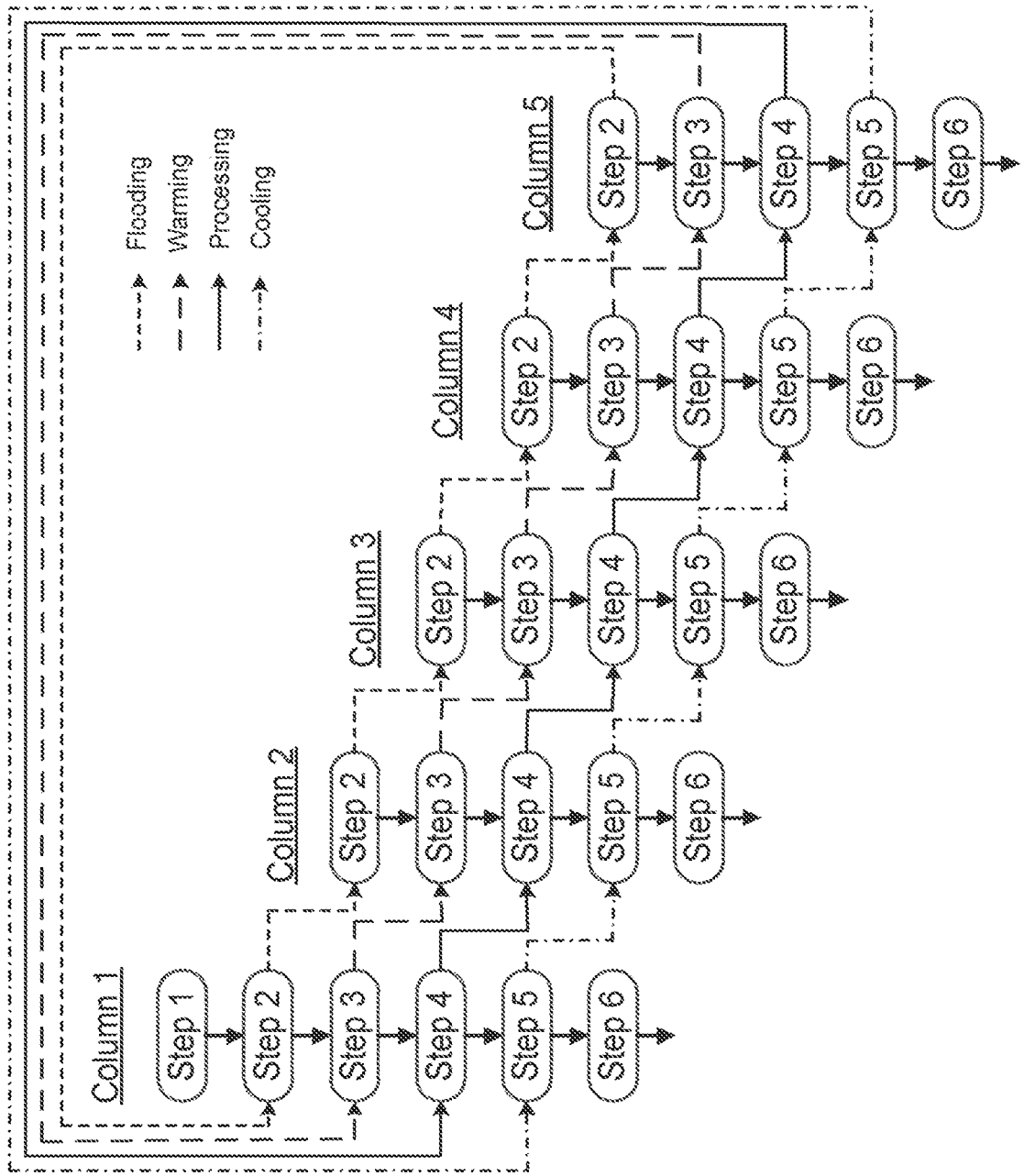
FIG. 5 is a schematic flowchart showing the operation of the commercial-scale PLPW extraction system shown in FIGS. 3 and 4.

An example of a semi-continuous process for PLPW extraction and recovery of components from biomass feedstocks using the commercial-scale PLPW apparatus shown in FIGS. 3, 4 is shown in FIG. 5. Generally, the PLPW process pressurizes preconditioned water to approximately 750 psi, and then raises the temperature of the pressurized water to approximately 180° C. before passing the heated and pressurized water through a selected pressure-resistant reactor column to extract components from a feedstock. The capacity of the exemplary PLPW apparatus is in terms of a flow rate from the range of about 2 L/min to about 30 L/min, about 4 L/min to about 20 L/min, about 6 L/min to about 15 L/min, about 8 L/min to about 12 L/min, about 10 L/min.

Figure 6:
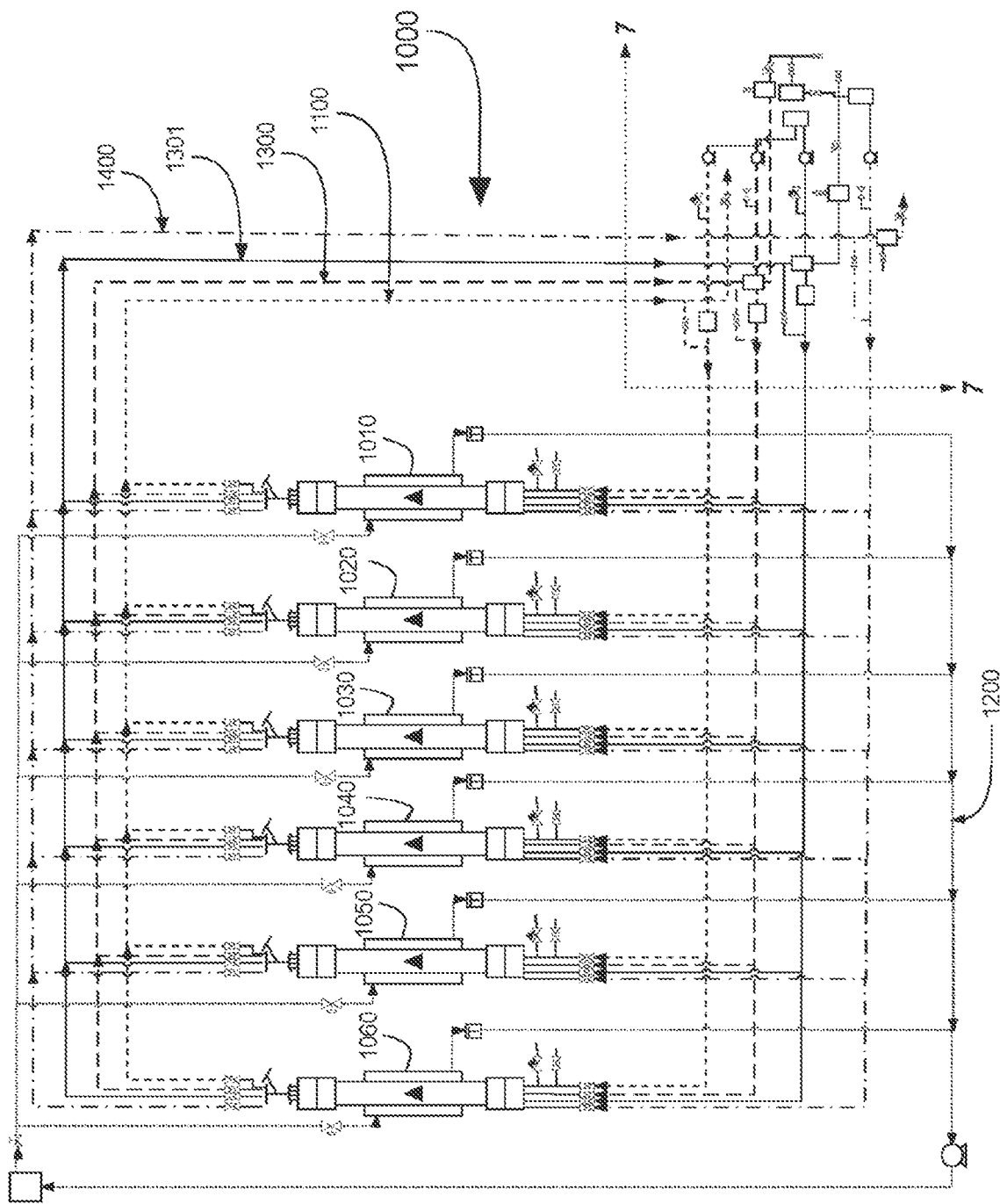
FIG. 6 is a schematic diagram of another example of a commercial-scale six-column PLPW system.
Figure 7:
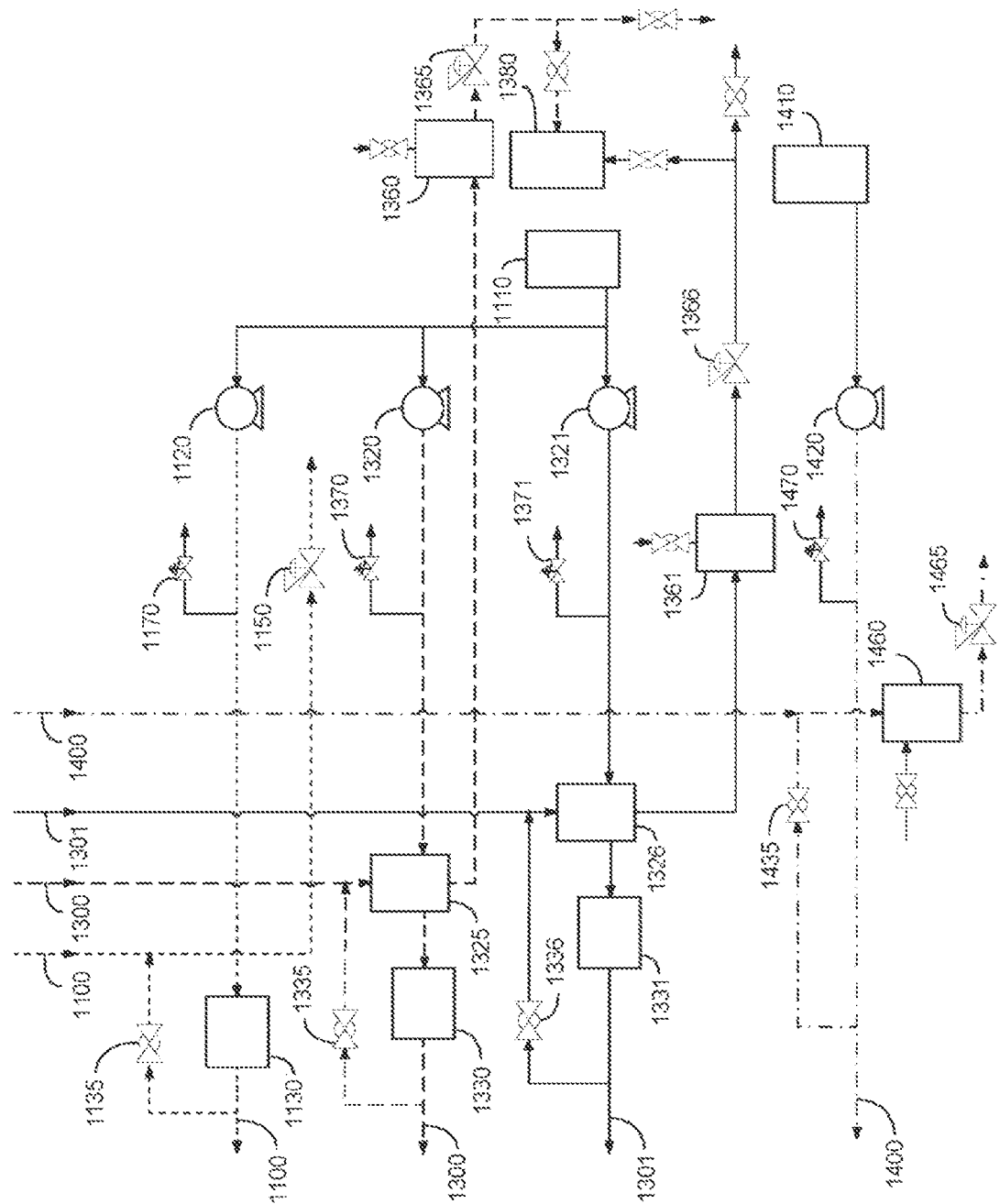
FIG. 7 is a close-up view of section 7 from FIG. 6.

Another example of a suitable commercial-scale PLPW apparatus and system 1000 that can be used to pressurize organic solvents, is shown in FIGS. 6 and 7. To facilitate economical operation, this commercial-scale PLPW apparatus 1000 may be operated as a semi-continuous process wherein two or more reaction pressure-resistant reactor columns are always being processed by separate supplies of PLP water and there is a continuous flow of PLPW extract from the system from each of the two or more reactor columns, while one or more unprocessed reactor columns is being unloaded or washed or loaded or serviced. The capacity of this example of a commercial-scale multiple-stream PLPW apparatus is referred to in terms of providing a flow rate into each of the selected reactor columns from the range of about 2 L/min to about 30 L/min, about 4 L/min to about 20 L/min, about 6 L/min to about 15 L/min, about 8 L/min to about 12 L/min, about 10 L/min. The commercial-scale multiple-stream PLPW apparatus 1000 comprises four independent process circuits 1100, 1200, 1300, 1400 (FIGS. 6, 7) that control the flow of PLPW through each reactor column 1010, 1020, 1030, 1040, 1050, 1060. The flow circuit for each reactor column 1010, 1020, 1030, 1040, 1050, 1060 is selected by an automated control system that controls the sequencing of valve operation within each reactor column circuit. The term "heater" is used to identify the equipment used to heat the process water and encompasses an "immersion heater" or a "shell and tube heat exchanger" that may be connected to a plant steam system.

Flooding Circuit 1100:

A selected reactor column filled with a biomass feedstock to be extracted, is flooded with hot water below 100° C. and then pressurized. The flooding circuit 1100 (FIGS. 6, 7) comprises a pump 1120 for pushing water from a first water reservoir 1110 through a heater 1130, into and through the selected column, that is one of 1010, 1020, 1030, 1040, 1050, 1060, then out to and through a back pressure regulator back to the flooding circuit 1100 and out of the system to a waste water drain. A flooding pressure relief valve 1170 may be provided interposed the pump 1120 and the heater 1130 if so desired. The flow of flooding hot water into each of the selected columns 1010, 1020, 1030, 1040, 1050, 1060 is controlled by a valve interposed the flooding circuit 1100 and the selected column. The flow of flooding hot water out of the selected column 1010, 1020, 1030, 1040, 1050, 1060 back to the flooding circuit 1100 is controlled by a valve interposed the selected column and the flooding circuit 1100. The flooding circuit 1100 additionally comprises a bypass valve 1135 to isolate the columns 1010, 1020, 1030, 1040, 1050, 1060 from the flooding circuit 1100.

Figure 8:
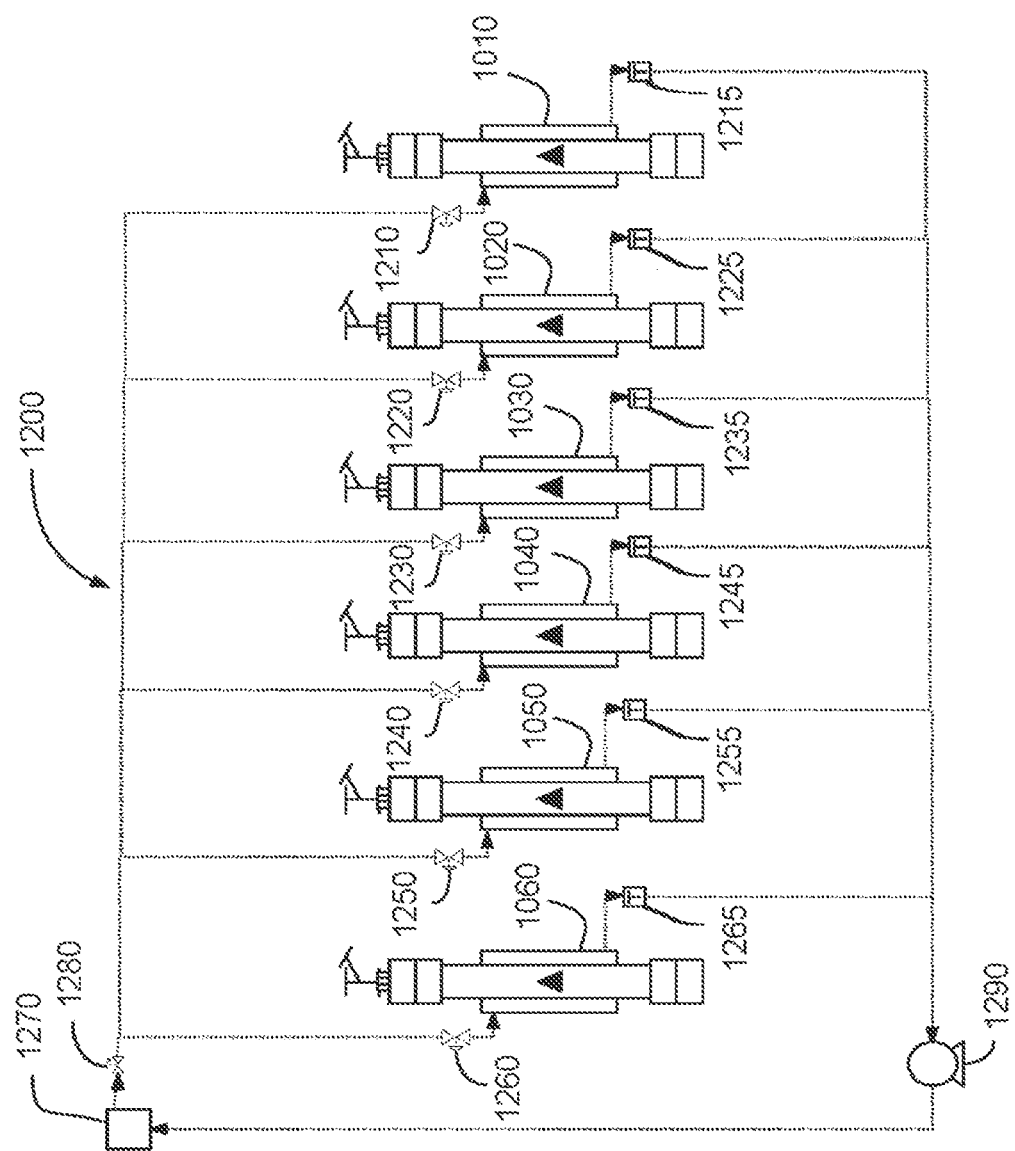
FIG. 8 is a schematic diagram of an example of a warming circuit for the six-column PLPW system shown in FIG. 6.

Warming Circuit 1200:

The warming circuit 1200 (FIG. 8), comprises a boiler 1270 from which steam is flowed into the jackets of columns 1010, 1020, 1030, 1040, 1050, 1060. The flow of steam from the boiler 1270 into the warming circuit is controlled by a steam inlet valve 1280. The flow of steam from the warming circuit 1200 into the jackets of columns 1010, 1020, 1030, 1040, 1050, 1060 is controlled by steam control valves 1210, 1220, 230, 240, 250, 260, respectively. The jackets of columns 1010, 1020, 1030, 1040, 1050, 1060 are provided with steam traps 1215, 1225, 1235, 1245, 1255, 1265, respectively, wherein steam egressing from the columns 1010, 1020, 1030, 1040, 1050, 1060, respectively is condensed prior to flowing back into the warming circuit 1200. A condensate return pump 1290 pushes the condensate back into the boiler 1270.

The purpose of the warming circuit 200 is to warm one or more selected columns 1010, 1020, 1030, 1040, 1050, 1060 to a selected desired processing temperature to minimize the loss of heat from PLP water by thermal conductivity to the columns and piping infrastructure interconnecting the columns with the utilities equipment during an extraction process.

First Processing Circuit 1300:

During the first processing circuit 1300 (FIGS. 6, 7), a first processing pump 1320 pushes water from the first water reservoir 1110 through the input side of a heat exchanger 1325, then through a heater 1330, after which the PLP water flows (under pressure from the first processing pump 1320) into a selected one of columns 1010, 1020, 1030, 1040, 1050, 1060 that is packed with biomass feedstock to be extracted. The flow of PLP water into each selected column is controlled by a valve interposed the processing circuit 1300 and the selected column. The flow of PLP water containing extracted phytochemicals out of the selected column back to the first processing circuit 1300 is controlled by a valve interposed the egress side of the column and processing circuit 1300. The egressing PLP water flows through the output side of a first processing heat exchanger 1325, then to and through a secondary heat exchanger 1360, through a back pressure regulator 1365, and out of the system to the collection vessel 1380. The first processing circuit 3100 additionally comprises a bypass valve 1335 to isolate the columns 1010, 1020, 1030, 1040, 1050, 1060 from the processing circuit 1300. The purpose of the first processing circuit 300 (FIGS. 6, 7) is to solubilise and extract the compounds of interest from the plant biomass feedstock material. The PLP water travels through the selected reactor column 1010, 1020, 1030, 1040, 1050, 10600 from bottom to the top in a single pass. The least concentrated water first passes through the most extracted feedstock material, thus maximizing the amount of product extracted. Additionally, due to the continuous flow-through nature of the extraction system, product is constantly removed from the system with low residence times while exposed to the operating conditions, thus reducing the amount of potential product degradation.

Second Processing Circuit 1301:

During the second processing circuit 1301 (FIGS. 6, 7), a second processing pump 1321 pushes water from the first water reservoir 1110 through the input side of a heat exchanger 1326, then through a heater 1331, after which the PLP water flows (under pressure from the second processing pump 1321) into a selected one of columns 1010, 1020, 1030, 1040, 1050, 1060 that is packed with biomass feedstock to be extracted. The flow of PLP water into each selected column is controlled by a valve interposed the processing circuit 1301 and the selected column. The flow of PLP water containing extracted phytochemicals out of the selected column back to the second processing circuit 1301 is controlled by a valve interposed the egress side of the column and processing circuit 1301. The egressing PLP water flows through the output side of a second processing heat exchanger 1326, then to and through a secondary heat exchanger 1361, through a back pressure regulator 1366, and out of the system to the collection vessel 1380. The first processing circuit 1301 additionally comprises a bypass valve 3136 to isolate the columns 1010, 1020, 1030, 1040, 1050, 1060 from the processing circuit 1301. The purpose of the second processing circuit 1301 (FIGS. 2, 6) is to, in parallel to the first processing circuit 1300 wherein compounds of interest in a first batch of the feedstock material are being solubilised and extracted in one of selected columns 1010, 1020, 1030, 1040, 1050, 1060, concurrently solubilize and extract the compounds of interest from a second batch of the feedstock material in another one of selected columns 1010, 1020, 1030, 1040, 1050, 1060.

Cooling Circuit 1400:

The last processing circuit, the cooling circuit 1400 (FIGS. 6, 7) cools down the reactor columns after the feedstock material has been fully extracted in two stages. In the cooling circuit 1400, the PLP water flows through the reactor column packed with the extracted feedstock material whereby the pump 1420 pushes water from the cooling water storage tank 1410 into the selected column 1010, 1020, 1030, 1040, 1050, 1060 through a valve interposed the cooling circuit 1400 and the selected column. The cooling water flows out of the egress side of the selected column through a valve interposed the egress side of the column and the cooling circuit 1400, then to and through the output side of a heat exchanger 1460, and then through the back pressure regulator 1465, and out of the system to the drain or alternatively, to a waste water treatment and purification equipment. The purpose of the cooling circuit 1400 is to lower the temperature of the extracted feedstock material and the reactor column to a level below the saturation temperature to enable safe removal of the extracted feedstock. Once the temperature is low enough, the system can be switched back to the cooling circuit 1100 and the selected column 1010, 1020, 1030, 1040, 1050, 1060 can be drained of water, the extracted feedstock removed, and fresh material added for the next extraction run.

It is to be noted that those skilled in these arts will be able to adjust and/or modify the various equipment options disclosed herein for producing a commercial-scale single-stream or multiple-stream PLPW apparatus that comprises three or more reactor columns wherein each column is provided with piping infrastructures communicating with at least a water supply, one or more heaters or heat exchangers for heating the water, and pumps for pressurizing the water to a temperature in the range of about 50° C. to about 65° C., from about 50° C. to about 85° C., from about 50° C. to about 100° C., from about 50° C. to about 125° C., from about 55° C. to about 150° C., from about 55° C. to about 175° C., from about 55° C. to about 185° C., from about 55° C. to about 195° C., from about 55° C. to about 205° C., from about 55° C. to about 225° C., from about 55° C. to about 250° C., from about 55° C. to about 275° C., from about 55° C. to about 300° C., from about 55° C. to about 325° C., from about 55° C. to about 350° C., from about 55° C. to about 375° C., from about 55° C. to about 400° C., and therebetween, and a pressure from the range of about 100 psi to about 500 psi, from about 125 psi to about 450 psi, from about 150 psi to about 400 psi, from about 165 psi to about 375 psi, from about 175 psi to about 350 psi, from about 175 psi to about 325 psi, from about 175 psi to about 300 psi, from about 175 psi to about 275 psi, from about 175 psi to about 250 psi, from about 175 psi to about 225 psi, and therebetween.

The commercial-scale multiple-stream PLPW apparatus may additionally comprise water purification equipment for receiving and processing therein the waste water stream egressing from the reactor columns during each initial warm-up circuit, flooding circuit, warming circuit, and cooling circuit, and then recycling the processed water back into one or more of the flooding circuit, warming circuit, and cooling circuit.

The aqueous solvent solutions disclosed herein can be provided to PLPW apparatus and systems in ways that are suitable for the type of PLPW apparatus and/or system that is being used. For example, for the laboratory-scale PLPW apparatus, the selected aqueous solvent solution can be prepared in advance and stored in a suitable bulk storage container from which the aqueous solvent solution can be pumped out of the bulk storage container when needed, then pressurized to produce the pressurized aqueous solvent solution, and then controllably flowed into and through the bench-scale reactor column while in the pressurized state.

In another example for the pilot-scale and commercial-scale PLPW apparatus and systems referred to herein, the organic solute and/or inorganic solute and preconditioned water may be stored in separate bulk containers, and then subsequently pumped into another bulk storage container wherein the organic solute and/or inorganic solute and preconditioned water are mixed together to produce an aqueous solvent solution with selected chemical properties, after which, the produced aqueous solvent solution may be stored until needed or alternatively, pumped out of the bulk mixing/storage container into the flooding and/or process circuit. Alternatively, the organic solute and/or inorganic solute and preconditioned water may be concurrently pumped out of their respective bulk storage containers and mixed together as they being conveyed to the flooding and/or process circuits.

Another embodiment of the present disclosure pertains to methods for extracting and recovering phytochemicals and other components from plant biomass feedstocks with pressurized aqueous solvent solutions produced by PLPW apparatus and/or systems. One example of the present methods comprises the steps of (i) preparing a selected aqueous solvent solution by mixing together one or more selected organic solutes and/or inorganic solutes with a supply of preconditioned water, (ii) providing a flow of the prepared aqueous solvent solution to a pressure-resistant temperature-controllable reactor vessel wherein has been provided a selected plant biomass feedstock, (iii) flooding the reactor vessel with the flow of the prepared aqueous solvent solution, (iv) warming the contents of the reactor vessel to a first selected temperature, (v) pressurizing the flow of the prepared aqueous solvent solution to a selected pressure, (vi) controllably flowing the pressurized prepared aqueous solvent solution through the reactor vessel while maintaining the contents of the reactor vessel at the selected pressure, (vii) collecting the flow of pressurized prepared aqueous solvent solution egressing from the reactor vessel for a selected period of time, then (viii) depressurizing the flow of prepared aqueous solvent mixture and concurrently depressurizing the reactor vessel, (ix) providing a cooling flow of one of the preconditioned water or alternatively, the prepared aqueous solvent solution, and (x) removing the extracted plant biomass feedstock from the reactor vessel. The collected flow of pressurized aqueous solvent solution egressing from the reactor vessel and containing therein phytochemicals and components extracted from the plant biomass feedstock (now referred to hereinafter as the "phytochemical extract"), may be further processed if so desired. For example, the phytochemical extract may be concentrated by evaporating away some of the pressurized aqueous solvent solution to produce a fluid with more-concentrated levels of the phytochemicals therein. Alternatively, the phytochemical extract may be dried by one of freeze drying, flash drying, vacuum drying, spray drying, fluid bed drying, continuous vacuum belt drying, paddle drying, sorption dehumidification drying, disc drying, centrifugation, microwave irradiation, and the like.

According to one aspect, the methods disclosed herein may include a step of preparing an aqueous solvent solution by mixing together with a supply of preconditioned water, one or more organic solutes from a group of food-safe organic solutes including ethanol, 2-propanol, ethyl acetate, ethyl lactate, hexane, cyclohexane, the like, and suitable mixtures thereof.

According to another aspect, the methods disclosed herein may include a step of preparing an aqueous solvent solution by mixing together with a supply of preconditioned water, one or more organic solutes from a group including methanol, acetone, chloroform, dichloromethane, diethel ether, isopropyl ether, diisopropyl ether, dioxin, petroleum ether, tetrahydrofuran, the like, and suitable mixtures thereof.

According to another aspect, the methods disclosed herein may include a step of preparing an aqueous solvent solution by mixing together with a supply of preconditioned water, one or more organic acids that are known to be food-safe, for example formic acid, acetic acid, propionic acid, butyric acid, valeric acid, lactic acid, malic acid, citric acid, benzoic acid, carbonic acid, sorbic acid, the like, and suitable mixtures thereof.

According to another aspect, the methods disclosed herein may include a step of preparing an aqueous solvent solution by mixing together with a supply of preconditioned water, one or more organic solutes that are known to modulate viscosity of solutions. Examples of viscosity-modulating solvents include glycerol, propylene glycol, polyethylene glycol, sorbitol, n-propyl alcohol, the like, and suitable mixtures thereof.

According to another aspect, the methods disclosed herein may include a step of preparing an aqueous solvent solution by mixing together with a supply of preconditioned water, one or more selected pH-adjusting agents. Examples of suitable pH-adjusting agents include organic solutes and/or inorganic solutes such acetic acid, monobasic ammonium phosphate, calcium acetate, calcium carbonate, calcium chloride, calcium citrate, calcium hydroxide, calcium oxide, monobasic calcium phosphate, calcium sulfate, citric acid, fumaric acid, lactic acid, magnesium citrate, magnesium sulfate, malic acid, phosphoric acid, potassium hydroxide, sodium hydroxide, the like, and suitable mixtures thereof.

According to another aspect, the methods disclosed herein may include a step of preparing an aqueous solvent solution by mixing together with a supply of preconditioned water, one or more inorganic solutes from a group including hydrochloric acid, nitric acid, phosphoric acid, sulfuric acid, and the like.

The following examples are provided to more fully describe the invention and are presented for non-limiting illustrative purposes.

EXAMPLES

Example 1: Extraction of Kava Root Biomass with Pressurized Aqueous Ethanol Solvent Solutions Aqueous ethanol was prepared by mixing thoroughly Reagent Alcohol (purchased BDH1156, BDH VWR Analytical), or equivalent Food grade, or USDA Certified Organic Ethanol with reverse osmosis (RO) $H_2O$ in a large container using the ratios shown in Table 1. The pH of the ethanol solvent solutions was 5.6.

TABLE 1

| Ethanol solvent concentration (%) | Volume of Reagent Ethanol (mL) | RO $H_2O$ volume (mL) | Total ethanol solvent volume (mL) |
| --- | --- | --- | --- |
| 0 | 0 | 1000 | 1000 |
| 25 | 250 | 750 | 1000 |
| 50 | 500 | 500 | 1000 |
| 75 | 750 | 250 | 1000 |
| 100 | 1000 | 0 | 1000 |

A laboratory-scale PLPW apparatus configured similarly to the laboratory-scale PLPW apparatus disclosed in CA 2,836,200 was used to extract bioactive compounds from chipped kava root biomass (*Piper methysticum*) with the prepared and pressurized ethanol solvent solutions.

For each extraction with one of the ethanol solvent solutions prepared as shown in Table 1, 10.00 g (9.008 g dry weight) of chipped kava root biomass were loaded and packed into the stainless steel extraction column with a frit at both ends. The extraction process was started by setting the column into the PLPW system and pumping a selected one the extraction mixture at a flow rate of 5 mL/min to bring the pressure up to 2 Mpa (300 psi). When the target pressure was reached, the flow of the pressurized ethanol solvent solution was stopped and the oven was warmed up to the target temperature of 160° C. When the target temperature was reached, the column was statically warmed for 15 min after which time, the pump was restarted to commence the flow of pressurized ethanol solvent through the kava root biomass at a flow rate of 5 mL/min. The first 5 mL of pressurized ethanol solvent solution egressing from the column were collected and discarded. Subsequently, a series of four sequential fractions of egressing pressurized ethanol solvent solution containing therein bioactive kavalactones extracted from the kava root biomass, were collected at 13.5 min intervals. Each fraction consisted of 7.5 mL/g and a total of 30 mL of egressing pressurized ethanol solvent solution were collected during the 54-min total extraction period. Each total ethanol solvent extract solution collected was dried by first removing the ethanol in a rotovap drier, after which, the remaining extract solution was freeze dried. The dried extracts were then analyzed to determine their kavalactone contents and yields.

Figure 10:
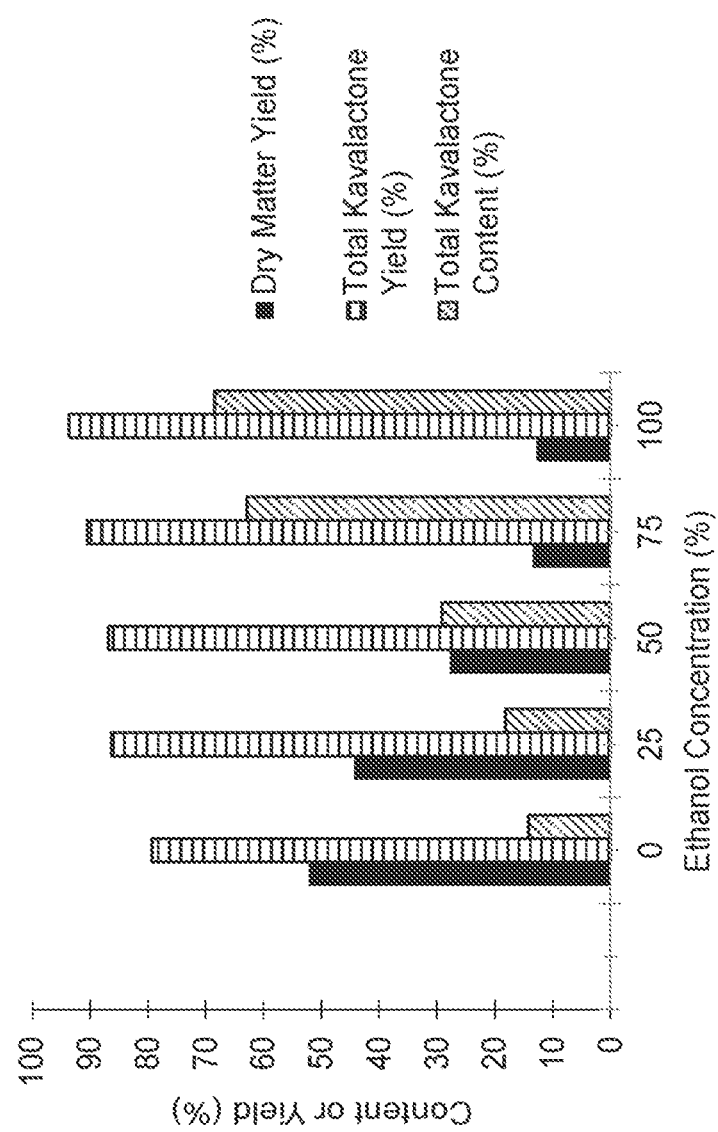
FIG. 10 is a chart showing the effects of different ethanol concentrations on the extraction of kavalactone from kava roots using a pressurized solvent extraction method according to an embodiment of the present disclosure.

The data shown in FIG. 10 demonstrate that as the ethanol concentration in the pressurized organic solvent solution used in this study was increased from 0% to 25% to 50% to 75% to 100%, the dry matter yield of phytochemicals in the egressing pressurized organic solvent solution decreased from 52.18% at 0% ethanol to 12.77% at 100% ethanol, indicating that kava root biomass contains a high proportion of alcohol insoluble material such as large oligosaccharides or polysaccharides. The yields of the bioactive compound kavalactone, increased gradually as the concentration of ethanol in the pressurized organic solvent solution was increased, peaking at 93.60% yield at 100% ethanol (FIG. 10). It is interesting to note that while kavalactones are insoluble in room temperature water, while the 0% ethanol extraction with PLP water yielded 79.31% of the available kavalactones (FIG. 10). The dry matter yield and kavalactone yield were inversely proportional as the ethanol concentration in the pressurized organic solvent solution was increased, and resulted in a highly concentrated extract containing 68.39% kavalactones when extracted with 100% ethanol (FIG. 10). The extract produced at each ethanol concentration displayed distinct appearances and consistencies after drying. The consistency trended to a more oily resin as the ethanol concentration was increased, while at the lower ethanol concentrations, the extract displayed a free flowing off-white powder. If the goal of the extraction is a high content, high yield extraction, high ethanol concentrations resulted in a very efficient extraction of kavalactones from the kava root. If on the other hand, a free flowing, partially water soluble powder is desired, the low concentration or even pure sub-critical water provides a very high yield of extraction of compounds that are normally insoluble in water at room temperature.

Example 2: Extraction of Spent Hops Biomass with Pressurized Aqueous Ethanol Solvent Solutions Aqueous ethanol was prepared by mixing thoroughly food-grade ethanol with reverse osmosis (RO) $H_2O$ in a large container using the ratios shown in Table 1. The pH of the ethanol solvent solutions was 5.6.

The laboratory-scale PLPW apparatus used in Example 1, was also used to extract bioactive compounds from spent CTZ hops (*Humulus lupulus*) with the prepared and pressurized ethanol solvent solutions.

The pressure and temperatures used to generate pressurized organic solvent solutions in this study were based on previous knowledge gained from PLPW extractions of spent CTZ hops biomass for the extraction and recovery of the predominant bioactive compounds in hops, i.e., prenylated chalcones.

For each extraction with one of the ethanol solvent solutions prepared as shown in Table 1, 15.24 g (dry weight) of spent CTZ hops biomass were loaded and packed into the stainless steel extraction column with a frit at both ends. The extraction process was started by setting the column into the PLPW system and pumping a selected one the extraction mixture at a flow rate of 5 mL/min to bring the pressure up to 2 Mpa (300 psi). When the target pressure was reached, the flow of the pressurized ethanol solvent solution was stopped and the oven was warmed up to the target temperature of 140° C. When the target temperature was reached, the column was statically warmed for 15 min after which time, the pump was restarted to commence the flow of pressurized ethanol solvent through the spent CTZ hops biomass at a flow rate of 5 mL/min. The first 5 mL of pressurized ethanol solvent solution egressing from the column were collected and discarded. Subsequently, a series of four sequential fractions of egressing pressurized ethanol solvent solution containing therein bioactive kavalactones extracted from the spent CTZ hops biomass, were collected at 23.13 min intervals over a total 92.52-min extraction time at a flow rate of 5 mL/min and a solvent:solid ratio of 30 mL/g. Each fraction consisted of 7.5 mL/g and a total of 30 mL of egressing pressurized ethanol solvent solution were collected during the total extraction period. Each total ethanol solvent extract solution collected was dried by first removing the ethanol in a rotovap drier, after which, the remaining extract solution was freeze dried. The dried extracts were then analyzed to determine their prenylated chalcone contents and yields.

Figure 11:
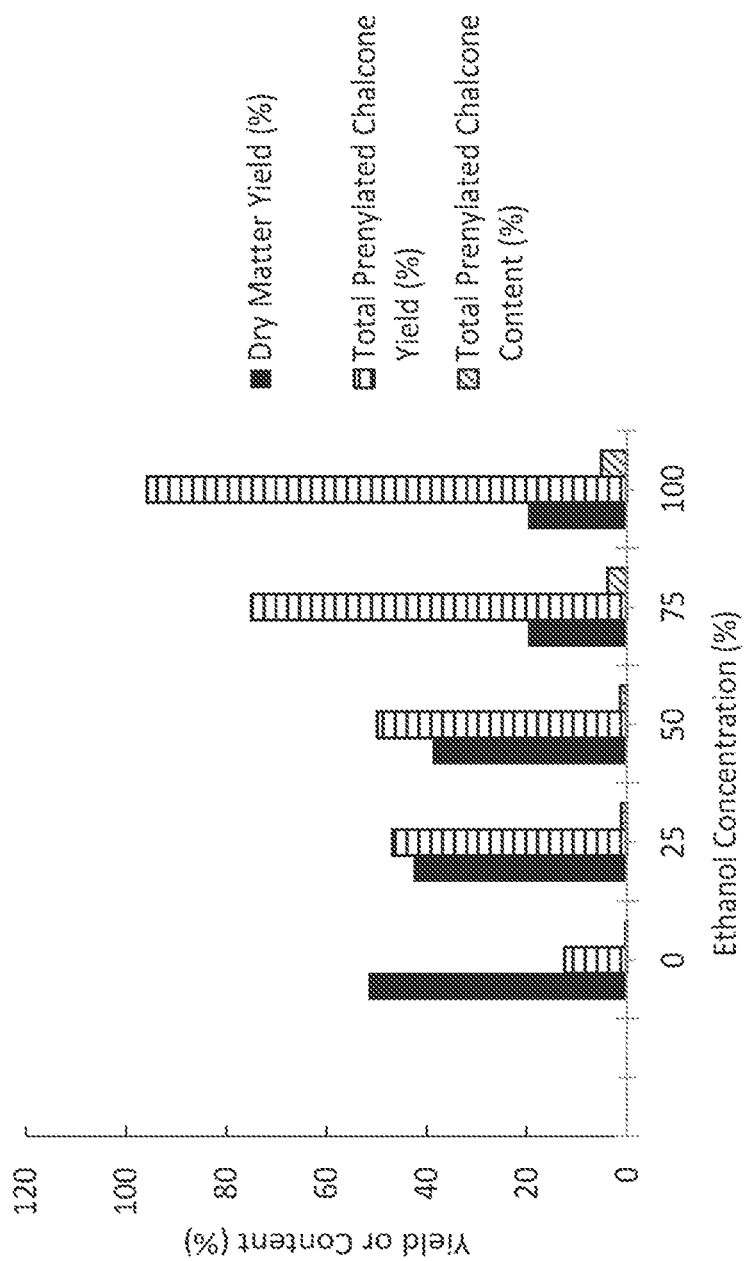
FIG. 11 is a chart showing the effects of different ethanol concentrations on the extraction of prenylated chalcone from spent hops using a pressurized solvent extraction method according to an embodiment of the present disclosure.

The data shown in FIG. 11 demonstrate that as the ethanol concentration in the pressurized organic solvent solution used in this study was increased from 0% to 25% to 50% to 75% to 100%, the dry matter yield of phytochemicals in the egressing pressurized organic solvent solution decreased from 51.57% at 0% ethanol to 19.62% at 100% ethanol, indicating that spent hops biomass contains a high proportion of alcohol insoluble material such as large oligosaccharides or polysaccharides. The yields of prenylated chalcones increased substantially from 12.47% at 0% ethanol to 95.74% yield at 100% ethanol (FIG. 11). In contrast to kavalactones in Example 1, it appears that prenylated chalcones are insoluble in water, even under sub-critical conditions.

Example 3: Extraction of White Oak Heartwood Biomass with Pressurized Aqueous Glycerol Solvent Solutions 99.5% glycerol (Prod. No. J64719; Alfa Aesar, Tewksbury, Mass., USA) was mixed with RO water at a 50:50 ratio to produce the pressurized organic solvent solution used in this study. Also used were pressurized 99.5% glycerol and pressurized 100% RO water.

The laboratory-scale PLPW apparatus used in the previous examples was also used to extract bioactive compounds from white oak heartwood biomass (*Quercus alba*) with the prepared and pressurized glycerol solvent solution. The oak biomass was a by-product produced by chipping wine barrels. The goal of this study was to create stable liquid extracts with a flavour profile of oak.

17.25 g (15.0 g) of white oak chips were loaded into the stainless steel extraction column with a frit at both ends. The extractions were performed at 150° C., at 5 mL/min flow rate, a solvent:solid ratio of 15 mL/g, and a pressure of 2 MPa (300 psi) with pressurized (i) 100% RO water as the control, (ii) 50% glycerol solvent solution, and (iii) 99.5% glycerol solvent solution. A total volume of 225 mL of egressing extract was collected from each pressurized solvent solution.

The data in Table 2 show that the oak extracts displayed a very slight decreasing trend in liquid dry matter concentration with increasing glycerine concentration (from 4.64% to 4.27%). Varying the glycerine concentration mainly resulted in organoleptic differences such as taste and appearance (Table 2). The pure sub-critical water extraction (0% glycerine) had an opaque dark brown appearance, with a very bitter taste, overcoming any oak flavor that was present. The 50% glycerine extract was slightly more translucent than the 0% extraction, but still had floating particles, results in an opaque extract unless settled. The taste of the 50% glycerine trial was less bitter and had some sweetness, and a slight taste of oak. Finally, the 100% glycerine extraction was very translucent with a small amount of sediment. The taste was very sweet, with some oak overtones. All three extraction trials smelled very strongly of oak.

TABLE 2

| Solvent solution | Dry matter concentration (g) | Colour | Taste | Smell |
| --- | --- | --- | --- | --- |
| 100% RO water | 4.64 | Dark brown, opaque | Bitter, little taste of oak | Strong smell of oak |
| 50% glycerol | 4.45 | Dark brown, opaque | Slight taste of oak, no bitterness | Strong smell of oak |
| 99.5% glycerol | 4.27 | Very dark brown, opaque | Sweet oaky taste | Strong smell of oak |

Example 4: Extraction of Kratom Leaf Biomass with Pressurized Aqueous Acetic Acid Solvent Solutions A 0.20 M acetic acid solution was prepared by adding 11.49 mL of glacial acetic acid (Prod. No. 1000-1-91; Caledon Laboratory Ltd., Georgetown, ON, CA) into 500 mL of RO water in a 1000-mL volumetric flask, after which, additionally RO water was added to make up the 1000-mL acetic acid solution.

The laboratory-scale PLPW apparatus used in the previous examples was also used to extract bioactive compounds in the form of alkaloids from kratom leaf biomass (*Mitragyna speciosa*) with the prepared and pressurized 0.20 M acetic acid solvent solution.

In this study, the efficiency of extraction of alkaloids from kratom leaf biomass was assessed at a pressure of 2 MPa (300 psi) and the following temperatures: 110° C., 130° C., 150° C., and 170° C. at a pressure of 2 MPa (300 psi) using (i) PLP water, and (ii) the 0.20 M acetic acid solvent solution.

For each extraction, 13.63 g (dry weight) of kratom leaf biomass were loaded and packed into the stainless steel extraction column with a frit at both ends. The extraction process was started by setting the column into the PLPW system and pumping a selected one the extraction mixture at a flow rate of 5 mL/min to bring the pressure up to 2 Mpa (300 psi). When the target pressure was reached, the flow of the pressurized ethanol solvent solution was stopped and the oven was warmed up to a selected target temperature, i.e., one of 110° C., 130° C., 150° C., and 170° C. When the target temperature was reached, the column was statically warmed for 15 min after which time, the pump was restarted to commence the flow of pressurized ethanol solvent through the kratom leaf biomass at a flow rate of 5 mL/min. The first 5 mL of pressurized ethanol solvent solution egressing from the column were collected and discarded. Subsequently, a series of four sequential fractions of egressing pressurized ethanol solvent solution containing therein bioactive alkaloids extracted from the kratom leaf biomass, were collected at 20.45 min intervals. Each fraction consisted of 7.5 mL/g and a total of 30 mL of egressing pressurized PLP water or 0.2 M acetic acid solvent solution were collected during the 81.8-min total extraction period. Each total solvent extract solution collected was freeze dried. The dried extracts were then analyzed to determine their alkaloid contents and yields.

Figure 12:
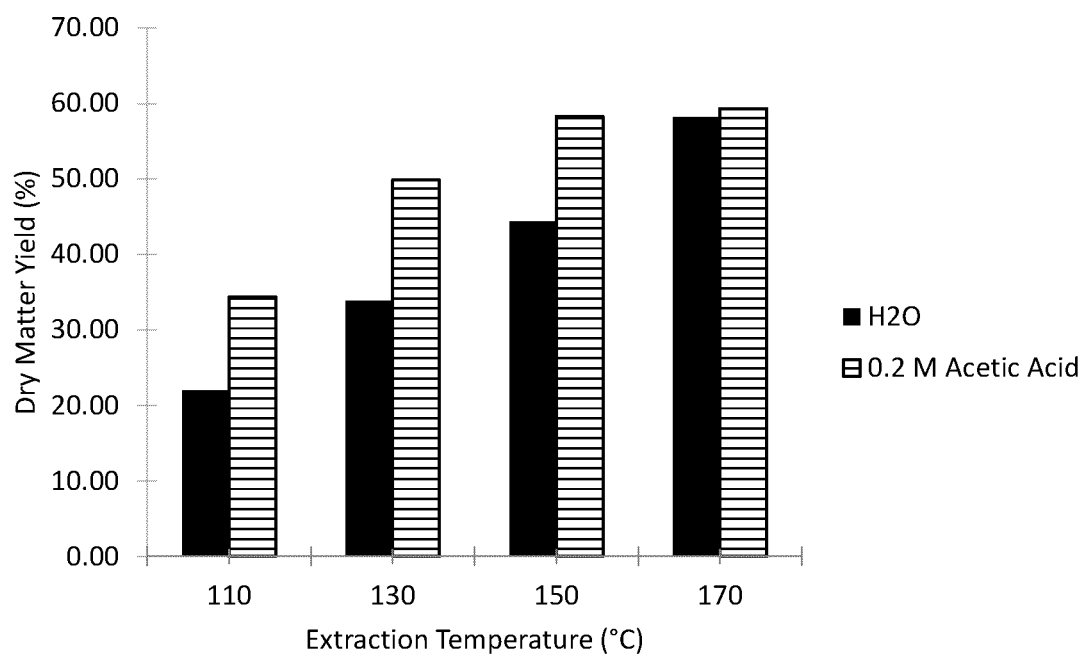
FIG. 12 is a chart showing the effects of temperature and acetic acid on dry matter yields from kratom leaves using a pressurized solvent extraction method according to an embodiment of the present disclosure.

The data shown in FIG. 12 indicate extractions of kratom leaf biomass using PLP water without acetic acid, exhibited a linear increase in dry matter yield over the range of temperatures from 21.99% to 58.19% at 170° C. The dry matter yield over the same temperature, when using 0.2 M acetic acid showed the same trend although at each temperature, the dry matter yield was 10%-15% higher (FIG. 12. This indicated that even a low concentration acetic acid can drastically influence the mass of extractives moving into the pressurized water solution. This effect appears to reach a maximum at 58%-59% dry matter yield for the acetic acid trials at 150° C. and 170° C. for pure water (FIG. 12).

Figure 13:
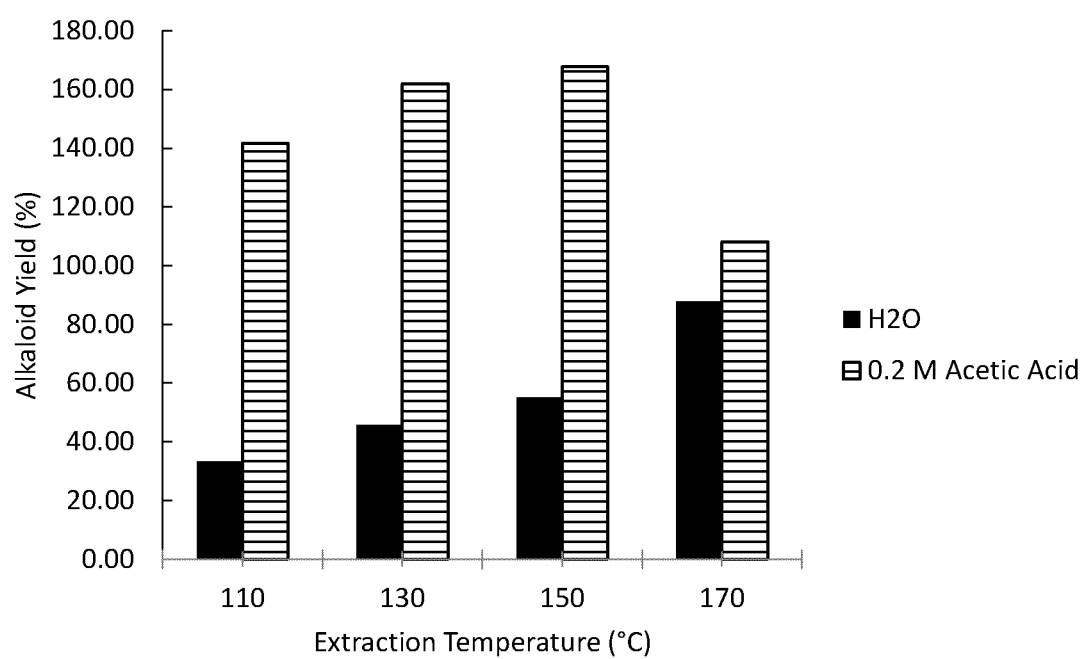
FIG. 13 is a chart showing the effects of temperature and acetic acid on extraction of alkaloids from kratom leaves using a pressurized solvent extraction method according to an embodiment of the present disclosure.

The data in FIG. 13 show that the extraction of alkaloids from kratom leaves with 100% PLP water increased linearly from 33% to 87% as extraction temperatures were increased from 110° C., 130° C., 150° C., to 170° C. When observing the alkaloid yields with extractions using pressurized 0.2 M acetic acid solvent solutions, it can be seen that the yields are all well over 100% (FIG. 13). This is likely due to the added acidity of acetic acid (to the PLPW system) more thoroughly extracting the kratom alkaloids from the biomass than even the raw material analysis procedure is able to, resulting in more mass of alkaloids coming out of the extraction than are able to be measured in the dried leaf. The extraction of alkaloids from kratom leaf biomass with pressurized 0.2 M acetic acid solvent solution reached a peak effectiveness at 150° C., where the alkaloid yield is 167% (FIG. 13). For the 170° C. extraction, the yield decreased to 108% indicating that some alkaloids were destroyed or degraded at this high temperature and acidity.

Example 5: Extraction of Blueberry Pomace Biomass with Pressurized Acidified and Basic PLP Water Solvent Solutions PLPW extractions of blueberry pomace biomass were performed with RO water adjusted to the following pHs: 2.0, 5.6, 8.0, 11.0. The pH 2.0 solution was prepared by adding 4.09 g of citric acid to 900 mL of RO water in a 1-L volumetric flask to which was then added sufficient RO water to bring the volume to 1 L, after which, the solution was mixed well. The 5.6 pH solution was used as delivered by a reverse-osmosis system. The 8.0 pH solution was prepared by dissolving 71.99 g of anhydrous monobasic sodium phosphate in 800 mL of RO water. The pH of the solution was adjusted to 8.0 with 1 M sodium hydroxide, after which, sufficient RO water was to bring the volume to 1 L and then the solution was well mixed. The 8.0 pH solution was prepared by dissolving 119.98 g of anhydrous monobasic sodium phosphate in 800 mL of RO water. The pH of the solution was adjusted to 11.0 with 1 M sodium hydroxide, after which, sufficient RO water was to bring the volume to 1 L and then the solution was well mixed.

The laboratory-scale PLPW apparatus used in the previous examples was also used to extract bioactive compounds in the form of anthocyanins from blueberry pomace biomass (*Vaccinium corymbosum*) with the pH-adjusted pressurized PLP water solvent solutions.

For each extraction with one of the pH-adjusted PLP water solvent solutions, 32.04 g (12.1 g dry weight) of blueberry pomace biomass were loaded and packed into the stainless steel extraction column with a frit at both ends. The extraction process was started by setting the column into the PLPW system and pumping a selected one the extraction mixture at a flow rate of 5 mL/min to bring the pressure up to 2 MPa (300 psi). When the target pressure was reached, the flow of the pressurized pH-adjusted PLP water solvent solution was stopped and the oven was warmed up to the target temperature of 90° C. When the target temperature was reached, the column was statically warmed for 15 min after which time, the pump was restarted to commence the flow of pressurized pH-adjusted PLP water solvent through the blueberry pomace biomass at a flow rate of 5 mL/min. The first 5 mL of pressurized pH-adjusted PLP water solvent solution egressing from the column were collected and discarded. Subsequently, a series of four sequential fractions of egressing pressurized pH-adjusted PLP water solvent solution containing therein bioactive anthocyanins extracted from the blueberry pomace biomass, were collected at 18.15 min intervals. Each fraction consisted of 7.5 mL/g and a total of 30 mL of egressing pressurized pH-adjusted PLP water solvent solution were collected during the 72.4-min total extraction period. Each total pH-adjusted PLP water solvent extract solution collected was freeze dried. The dried extracts were then analyzed to determine their anthocyanins contents and yields.

Figure 14:
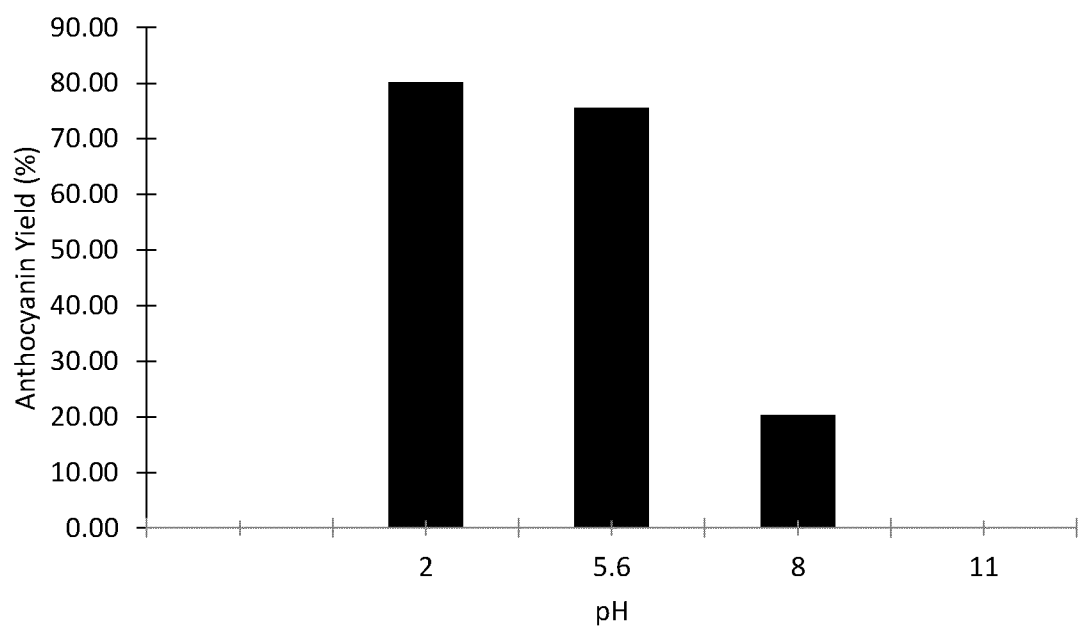
FIG. 14 is a chart showing the effects of pH on extraction of anthocyanins from blueberry pomace using a pressurized solvent extraction method according to an embodiment of the present disclosure.

Anthocyanins display variations in color dependent on the pH of the aqueous solution. Along with these changes in color, there is also an increased stability of these compounds at acidic pH. The yield of anthocyanins was inversely related with the increasing pH (FIG. 14). The highest yield and recovery of anthocyanins was produced at a pH of 2.0, confirming the acidic-stability of the anthocyanins, even at the high pressure/temperature of the PLPW system (FIG. 14). A 5% increase in yield over the standard PLPW (pH 5.6 trial, typical RO water) was observed, indicating that acidic conditions can give an increased recovery during extraction. Conversely, at pH 8.0 and 11.0 the anthocyanins were degraded rapidly, with anthocyanin yields of 20.3% and 0% respectively (FIG. 14).

The invention claimed is:
1. A method for extracting and recovering a bioactive component from a biomass feedstock with pressurized subcritical aqueous solvent solutions, comprising:
   (i) preparing a selected aqueous solvent solution comprising one or more organic solutes and/or one or more inorganic solutes, for pressurizing;
   (ii) providing a flow of the prepared aqueous solvent solution to a pressure-resistant temperature-controllable reactor vessel containing contents comprising the biomass feedstock therein, thereby flooding the contents of the reactor vessel;
   (iii) warming the flooded contents of the reactor vessel to a first selected temperature;
   (iv) pressurizing the flow of the prepared aqueous solvent solution and the flooded contents of the reactor vessel to a first selected pressure thereby producing a flow of pressurized subcritical aqueous solvent solution;

(v) controllably flowing the pressurized subcritical aqueous solvent solution through the reactor vessel while maintaining the contents of the reactor vessel at the first selected pressure and the first selected temperature; and (vi) collecting for a first selected period of time, a first egressing flow of the pressurized subcritical aqueous solvent solution from the reactor vessel, said collected egressing flow of pressurized subcritical aqueous solvent solution comprising the bioactive component extracted from the biomass feedstock.

2. The method according to claim 1, additionally comprising a step of removing a portion of the aqueous solvent solution from the collected first egressing flow thereby producing a first concentrated fluid extract of the bioactive component from the biomass feedstock.

3. The method according to claim 1, additionally comprising a step of drying a portion of the collected first egressing flow of pressurized subcritical aqueous solvent solution thereby producing a first dried extract of the bioactive component from the biomass feedstock.

4. The method according to claim 1, wherein the aqueous solvent solution comprises an organic solute, wherein the organic solute is selected from the group consisting of ethanol, 2-propanol, ethyl acetate, ethyl lactate, hexane, cyclohexane, and mixtures thereof, or wherein the aqueous solvent solution comprises an organic solute selected from the group consisting of methanol, acetone, chloroform, dichloromethane, diethyl ether, isopropyl ether, diisopropyl ether, dioxin, petroleum ether, tetrahydrofuran, and mixtures thereof.

5. The method according to claim 1, wherein the organic solute is selected from the group consisting of formic acid, acetic acid, propionic acid, butyric acid, valeric acid, lactic acid, malic acid, citric acid, benzoic acid, sorbic acid, and mixtures thereof, or wherein the organic solute is selected from the group consisting of glycerol, propylene glycol, polyethylene glycol, sorbitol, n-propyl alcohol, and mixtures thereof, or wherein the inorganic solute is selected from the group consisting of carbonic acid, hydrochloric acid, nitric acid, phosphoric acid, and sulfuric acid.

6. The method according to claim 1, wherein the aqueous solvent solution comprises an organic solute selected from the group consisting of ethanol, 2-propanol, ethyl acetate, ethyl lactate, hexane, cyclohexane, methanol, acetone, chloroform, dichloromethane, diethyl ether, isopropyl ether, diisopropyl ether, dioxin, petroleum ether, tetrahydrofuran, formic acid, acetic acid, propionic acid, butyric acid, valeric acid, lactic acid, malic acid, citric acid, benzoic acid, carbonic acid, sorbic acid, glycerol, propylene glycol, polyethylene glycol, sorbitol, n-propyl alcohol, and mixtures thereof.

7. The method according to claim 1, wherein the aqueous solvent solution comprises a pH-adjusting agent, the pH-adjusting agent adjusting a pH of the aqueous solvent solution to a value from the range of 2.0 to 11.0.

8. The method according to claim 1, wherein the flow of the prepared aqueous solvent solution is pressurized to a pressure from the range of 0.7 MPa to 17.2 MPa.

9. The method according to claim 1, additionally comprising steps (vii)-(ix), wherein at the end of the first selected period of time, (vii) the flow of the pressurized subcritical aqueous solvent solution and the reactor vessel are warmed to a second selected temperature thereby producing a second flow of the pressurized subcritical aqueous solvent solution;

(viii) controllably flowing the second flow of the pressurized subcritical aqueous solvent solution through the reactor vessel while maintaining the contents of the reactor vessel at the first selected pressure and the second selected temperature; and (ix) collecting for a second selected period of time, a second egressing flow of the second pressurized subcritical aqueous solvent solution from the reactor vessel, said collected second egressing flow of the second pressurized subcritical aqueous solvent solution comprising the bioactive component extracted from the biomass feedstock.

10. The method according to claim 9, additionally comprising a step of removing a portion of the aqueous solvent solution from the collected second egressing flow thereby producing a second concentrated fluid extract of the bioactive component from the biomass feedstock.

11. The method according to claim 9, additionally comprising a step of drying a portion of the collected second egressing flow of pressurized prepared aqueous solvent solution thereby producing a second dried extract of the bioactive component from the biomass feedstock.

12. The method according to claim 9, additionally comprising steps (x)-(xii), wherein at the end of the second selected period of time, (x) the flow of the second pressurized subcritical aqueous solvent solution and the reactor vessel are warmed to a third selected temperature thereby producing a third pressurized subcritical aqueous solvent solution;

(xi) controllably flowing the third pressurized subcritical aqueous solvent solution through the reactor vessel while maintaining the contents of the reactor vessel at the first selected pressure and the third selected temperature; and (xii) collecting for a third selected period of time, a third egressing flow of the third pressurized subcritical aqueous solvent solution from the reactor vessel, said collected third egressing flow of pressurized subcritical aqueous solvent solution comprising the bioactive component extracted from the biomass feedstock.

13. The method according to claim 12, additionally comprising a step of removing a portion of the aqueous solvent solution from the collected third egressing flow thereby producing a third concentrated fluid extract of the bioactive component from the biomass feedstock.

14. The method according to claim 12, additionally comprising a step of drying a portion of the collected third egressing flow of pressurized subcritical aqueous solvent solution thereby producing a third dried extract of bioactive components from the biomass feedstock.

15. The method according to claim 1, additionally comprising steps (xiii)-(xv), wherein at the end of the first selected period of time, (xiii) pressurizing the flow of the prepared aqueous solvent solution and the flooded contents of the reactor vessel to a second selected pressure thereby producing a second flow of the pressurized subcritical aqueous solvent solution;

(xiv) controllably flowing the second flow of the pressurized subcritical aqueous solvent solution through the reactor vessel while maintaining the contents of the reactor vessel at the second selected pressure and the first selected temperature; and (xv) collecting for a second selected period of time, a second egressing flow of the second pressurized subcritical aqueous solvent solution from the reactor vessel, said collected second egressing flow of the pressurized subcritical aqueous solvent solution comprising the bioactive component extracted from the biomass feedstock.

16. The method according to claim 15, additionally comprising a step of removing a portion of the aqueous solvent solution from the collected second egressing flow thereby producing a second concentrated fluid extract of the bioactive component from the biomass feedstock.

17. The method according to claim 15, additionally comprising a step of drying a portion of the collected second egressing flow of pressurized prepared aqueous solvent solution thereby producing a second dried extract of the bioactive component from the biomass feedstock.

18. The method according to claim 15, additionally comprising steps (xvi)-(xviii), wherein at the end of the second selected period of time,
(xvi) pressurizing the flow of the prepared aqueous solvent solution and the flooded contents of the reactor vessel to a third selected pressure thereby producing a third pressurized subcritical aqueous solvent solution;
(xvii) controllably flowing the third pressurized subcritical aqueous solvent solution through the reactor vessel while maintaining the contents of the reactor vessel at the third selected pressure and the first selected temperature; and
(xviii) collecting for a third selected period of time, a second egressing flow of the third pressurized subcritical aqueous solvent solution from the reactor vessel, said collected second egressing flow of the third pressurized subcritical aqueous solvent solution comprising the bioactive component extracted from the biomass feedstock.

19. The method according to claim 18, additionally comprising a step of removing a portion of the aqueous solvent solution from the collected third egressing flow thereby producing a third concentrated fluid extract of the bioactive component from the biomass feedstock.

20. The method according to claim 18, additionally comprising a step of drying a portion of the collected third egressing flow of pressurized prepared aqueous solvent solution thereby producing a third dried extract of the bioactive component from the biomass feedstock.

* * * * *